United States Patent

Tabata et al.

Patent Number: 5,921,885
Date of Patent: Jul. 13, 1999

[54] CONTROL SYSTEM FOR AUTOMATIC TRANSMISSION

[75] Inventors: Atsushi Tabata, Okazaki; Yasuo Hojo, Nagoya; Hideki Miyata, Toyota; Akira Hukatsu, Anjo, all of Japan

[73] Assignees: Toyota Jidosha Kabushiki Kaisha, Toyota; Aisin Aw Kabushiki Kaisha, Anjo, both of Japan

[21] Appl. No.: 08/776,842

[22] PCT Filed: Jun. 12, 1996

[86] PCT No.: PCT/JP96/01590

§ 371 Date: Feb. 13, 1997

§ 102(e) Date: Feb. 13, 1997

[87] PCT Pub. No.: WO97/00391

PCT Pub. Date: Jan. 31, 1997

[30] Foreign Application Priority Data

Jun. 16, 1995 [JP] Japan .................................. 7-172975

[51] Int. Cl.⁶ .................................. F16H 61/00
[52] U.S. Cl. .................. 477/107; 477/158; 477/174; 477/906; 477/125; 701/59
[58] Field of Search .................. 477/143, 156, 477/158, 168, 174, 906, 102, 83, 84, 90, 91, 107, 125; 701/59, 58, 62

[56] References Cited

U.S. PATENT DOCUMENTS

| 4,393,732 | 7/1983 | Suzuki et al. ........................... 477/125 |
| 4,718,311 | 1/1988 | Hayakawa et al. . |
| 4,785,689 | 11/1988 | Iwatsuki et al. ..................... 477/906 X |
| 4,827,806 | 5/1989 | Long et al. .............................. 477/131 |
| 4,982,624 | 1/1991 | Takada et al. . |
| 5,083,481 | 1/1992 | Smith et al. ......................... 477/158 X |
| 5,103,692 | 4/1992 | Shimanaka et al. ..................... 477/109 |
| 5,109,734 | 5/1992 | Fujiwara . |
| 5,133,231 | 7/1992 | Goto et al. . |
| 5,291,804 | 3/1994 | Kashihara et al. . |
| 5,293,789 | 3/1994 | Goto et al. . |
| 5,363,724 | 11/1994 | Asahara et al. . |
| 5,403,248 | 4/1995 | Ando et al. . |
| 5,433,124 | 7/1995 | Person . |
| 5,472,389 | 12/1995 | Ando et al. . |
| 5,496,228 | 3/1996 | Takata et al. ........................... 477/107 |
| 5,501,645 | 3/1996 | Taniguchi et al. . |
| 5,505,673 | 4/1996 | Tsukamoto et al. . |
| 5,527,233 | 6/1996 | Tabata et al. ....................... 477/906 X |
| 5,613,921 | 3/1997 | Sugiyama et al. .................. 477/156 X |
| 5,665,027 | 9/1997 | Oba et al. ........................... 477/125 X |
| 5,669,849 | 9/1997 | Tabata et al. ........................... 477/102 |
| 5,682,792 | 11/1997 | Liesener et al. .................... 477/906 X |

FOREIGN PATENT DOCUMENTS

| 62-244719 | 10/1987 | Japan . |
| 1-299351 | 12/1989 | Japan . |
| 4-300457 | 10/1992 | Japan . |
| 5-126246 | 5/1993 | Japan . |

*Primary Examiner*—Dirk Wright
*Assistant Examiner*—Peter T. Kwon
*Attorney, Agent, or Firm*—Oblon, Spivak, McClelland, Maier & Neustadt, P.C.

[57] ABSTRACT

An automatic transmission control system is equipped with a pressure modulating valve for regulating the engaging pressure to be supplied to frictional engagement elements for setting respective gear stages of the automatic transmission, a signal pressure output valve for providing signal pressure, and a switching valve. The control system further includes a switching valve for switching destinations of signal pressure for setting pressure regulation level between pressure modulating valve and other control valve; an abnormality-detection element for detecting, in gear shift to a gear stage set by the frictional engagement elements engaged on delivery of regulated oil pressure, abnormal regulation of engaging pressure to be delivered to the frictional engagement elements and abnormal operation due to delivery of the signal pressure to the control valve; and gear-shift-inhibition element for inhibiting shift to the gear stage in case that the abnormality-detection element detects at least one of abnormal pressure regulation and the abnormal operation.

24 Claims, 12 Drawing Sheets

|      | C-0 | C-1 | C-2 | B-0 | B-1 | B-2 | B-3 | B-4 | F-0 | F-1 | F-2 |
|------|-----|-----|-----|-----|-----|-----|-----|-----|-----|-----|-----|
| N    | ○   |     |     |     |     |     |     |     |     |     |     |
| REV  |     |     | ○   | ○   |     |     |     | ○   |     |     |     |
| 1ST  | ○   | ○   |     |     |     |     |     | ●   | ○   |     | ○   |
| 2ND  | ●   | ○   |     |     |     |     | ○   |     | ○   |     |     |
| 3RD  | ○   | ○   |     |     | ●   | ○   |     |     | ○   | ○   |     |
| 4TH  | ○   | ○   | ○   |     |     | ◎   |     |     | ○   |     |     |
| 5TH  |     | ○   | ○   | ○   |     | ◎   |     |     |     |     |     |

CONTROL SYSTEM FOR AUTOMATIC TRANSMISSION

TECHNICAL FIELD

This invention relates to a control system for an automatic transmission of a vehicle, and more particularly to a control system including pressure modulating valve to modulate hydraulic pressure acting on frictional engagement means such as a clutch and a brake.

BACKGROUND ART

As is well-known in the art, when shifting of an automatic transmission for a vehicle is executed, in order to prevent a delay in the shift and a shift shock, it is necessary to control hydraulic pressure supplied to the frictional engagement means such as a clutch and a brake. Therefore, control systems have been developed which are so constructed that the engaging pressure acting on one of the two frictional engagement means required to switch between engaged and released states is directly controlled by means of a pressure modulating valve.

For instance, in an automatic transmission equipped with a gear train wherein one brake is engaged in the forward second gear stage and the brake is released with another brake engaged in up-shifting to the forward third gear stage, gear shifting between these gear stages becomes so-called clutch-to-clutch shift. It is sometimes necessitated to control the hydraulic pressure for one of the two brake (for example a brake to set the forward second speed gear stage for instance) by means of a pressure control valve adjustable in pressure modulating level.

Although a signal pressure for setting the pressure modulating level of the pressure control valve could be applied by a linear solenoid valve specially devised for the control valve, inconvenience of large-sized control system will be caused due to increased number of solenoid valves in such a structure.

In order to overcome the above-mentioned inconvenience, application of a conventional linear solenoid valve as a measure for changing the pressure modulating level of the above-mentioned control valve can be considered. In this case, since the linear solenoid valve is to be operated for setting a pressure modulating level of the above-mentioned control valve when required while being operated for its primary purpose on the other hand, the linear solenoid valve is necessarily so constructed as to switch its output pressure (signal pressure) between primary control object and the control valve, making it general to use a switching valve; wherein, in addition, the conventional linear solenoid valve can be used both for its primary purposes and as the switching valve.

In addition, it can be considered to take measures against pressure modulation failure; for example, to apply the line pressure provided through a shifting valve directly to the brake in a case of a failure where adjustment of braking pressure for the second gear stage by means of the control valve is impossible, thereby making the setting of the second gear stage sure.

When the control system is composed as mentioned above, smooth clutch-to-clutch shifting can be accomplished without requiring increased number of the valves in particular. However, in a case where the signal pressure is not supplied to the control valve due to a failure occurred in the aforementioned switching valve, the line pressure is directly applied to the brake in setting the second gear stage; thereby regulation of hydraulic pressure applied to the brake for the second speed gear stage cannot be performed, resulting in possibility of increased shift shock.

In addition, in case of the gear shifting from the third gear stage to the second gear stage which is so-called clutch-to-clutch shift for example, if the line pressure is applied to the brake for the second gear stage during this gear shifting, there occurs a so-called tie-up condition, wherein two brakes have unexpectedly torque capacity; causing an excessive braking torque in addition to aggravated shift shock and thereby possibilities of deterioration in durability of the friction material of the brake means due to its wear.

The primary object of the present invention is to provide a control system for automatic transmissions capable of prevention of the shift shock and deterioration in durability of the friction material and so on by sure and rapid detection of failure.

The another object of the present invention is to restrain abnormal torque acting on the frictional engagement means in a case of failure.

The further object of the present invention is to prevent the control system from accepting an erroneous signal as a datum.

DISCLOSURE OF THE INVENTION

The control system according to the present invention is a control system for automatic transmissions including the first frictional engagement means to be engaged in a gear-shifting from a first gear stage to a second gear stage; the second frictional engagement means to be released during the above mentioned gear-shifting; pressure modulating valve for regulating engagement pressure acting on the above mentioned first frictional engagement means; signal output valve for providing signal pressure to modify pressure regulation level of the pressure modulating valve; and switching valve for applying engaging pressure regulated by the pressure modulating valve to the first frictional engagement means and the signal pressure to the pressure modulating valve as well in normal condition, and in addition, for applying engaging pressure from another hydraulic pressure source to the first frictional engagement means and the signal pressure to control valve separate from the pressure modulating valve as well in a case of failure. Moreover, the control system includes abnormality-detecting means which detects, during the gear-shifting to the second gear stage, both conditions of abnormality in pressure regulation of the engaging pressure for the first frictional engagement means, and of abnormal operation resulted from supply of the signal pressure to the control valve; and gear-shift-inhibition means for inhibiting the shift to the second gear stage in a case that the abnormality-detecting means detects at least one of either the abnormality in pressure regulation or the abnormal operation.

Accordingly, in gear shifting from the first gear stage to the second gear stage, the first frictional engagement means is supplied with hydraulic pressure and thereby engaged; wherein the engaging pressure is regulated by means of pressure modulating valve. Since the pressure regulation level in this state is determined by the signal pressure from the signal pressure output valve, there occurs abnormality such as sudden engagement of the first frictional engagement means if signal pressure supply to the pressure modulating valve is restrained due to a failure in the switching valve. In addition, since the aforementioned signal pressure is to be sent to the control valve, abnormal operation due to "miss-operation" of the control valve results.

If abnormal states such as abnormal pressure regulation or abnormal operation occurs, the abnormality-detecting means detects them. Then the gear-shift-inhibition means inhibits, based on the results from the abnormality-detecting means, the shifting to the second gear stage set by engaging the aforementioned first frictional engagement means. Thereby, inconvenience such as sudden engagement of the first frictional engagement means or simultaneous engagement of the first and the second frictional engagement means are prevented.

In the present invention, a duty-controlled solenoid valve may be used as the signal pressure output valve.

In the present invention, in addition, a control valve for controlling a lock-up clutch of torque converter actuated by the signal pressure may be adopted as the aforementioned control valve.

In this case, means to determine the failure based on abnormality in state of engagement of the lock-up clutch may be adopted as abnormality-detecting means.

When the abnormality-detecting means is a detecting means so devised as to determine abnormality based on abnormality in pressure regulation, the abnormality-detecting means may be so arranged as to determine the abnormal state by judging whether the number of detection of abnormalities in pressure regulation reaches to a predetermined value.

In addition, a detecting means to determine abnormal state based on increase in input R.P.M. to the automatic transmission may be adopted as abnormality-detecting means in the present invention.

Moreover, the gear-shift-inhibition means in the present invention may be of those including means for switching to gear-shifting-map with domain to inhibit gear shifting excluded.

Furthermore, the control system in the present invention may include engine-output-reduction means for reducing engine output in place of or in addition to the aforementioned gear-shift-inhibition means.

The engine-output-reduction means is for reducing engine output in the case that the aforementioned abnormality-detecting means detects at least one of abnormalities either in the aforementioned pressure regulation or the above-mentioned operation.

The engine-output-reduction means may be of means for reducing engine output by controlling ignition delay timing or by reducing amount of fuel injection.

Accordingly, since the engine-output-reduction means reduces the engine output in the case that the abnormality-detecting means detects abnormal pressure regulation or abnormal operation, even if abnormality occurs in engagement of the first frictional engagement means during gear shifting to the above-mentioned second gear stage, excessive aggravation of shift shock is prevented because input torque is reduced; and aggravation of durability of the frictional engagement means is prevented as well because the torque applied on one each of the frictional engagement means is reduced.

In addition, the present invention may include learning control means and learning-inhibition means instead of or together with the aforementioned gear-shift-inhibition means and engine-output-reduction means. The learning control means is a system for performing learning control wherein the system renews the pressure regulation level of the pressure modulating valve basing on actual control status, and learning-inhibition means is a system to inhibit the learning control by the above learning control means in case that the abnormality-detecting means detects abnormality.

Accordingly, since the learning control, wherein the pressure regulation level of the engaging pressure of the first frictional engagement means is renewed based on the actual engagement status, is inhibited by the learning-inhibition means in case of detection of the above-mentioned abnormality by the abnormality-detecting means, erroneous renewal of pressure regulation level due to abnormal state with the pressure regulation missing will not arise and thereby abnormality in pressure regulation in succeeding gear shift control is prevented beforehand.

BEST MODE FOR CARRYING OUT THE INVENTION

Figure 1:
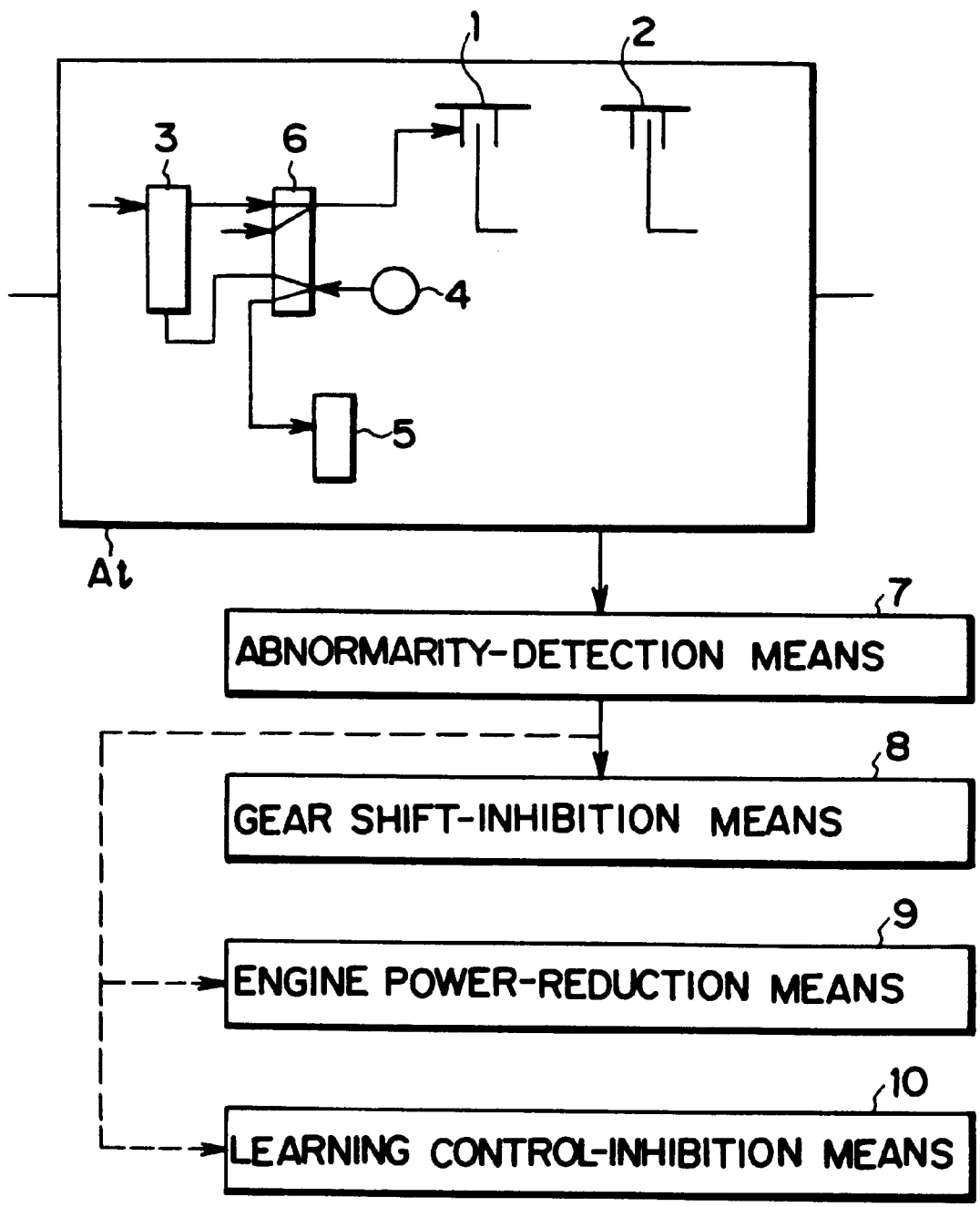
FIG. 1 is a block diagram schematically showing relation between functional means in the present invention.

FIG. 1 schematically illustrates basic structure according to preferred embodiment of the present invention. A control system according to the present invention relates to automatic transmission At including first frictional engagement means 1 to be engaged in gear shifting from designated certain first gear stage to consequent second gear stage, and second frictional engagement means 2 to be disengaged in the gear shifting operation. And the control system includes pressure modulating valve 3 for regulating engaging pressure for the first frictional engagement means 1; signal pressure output valve 4 for providing signal pressure for modifying pressure regulation level of the pressure modulating valve 3; and switching valve 6 for sending the aforementioned signal pressure in normal state to the aforementioned pressure modulating valve 3 along with sending engaging pressure regulated by the aforementioned pressure modulating valve 3 to the aforementioned first frictional engagement means 1, meanwhile sending the signal pressure in case of failure to control valve 5 except for the pressure modulating valve 3 along with sending uncontrolled engaging pressure to the first frictional engagement means 1. Moreover, as a distinctive structural feature, the control system according to preferred embodiment of the present invention includes abnormality detecting means 7 for detecting at least one of abnormalities in pressure regulation of engaging pressure for the aforementioned first frictional engagement means 1 and abnormal operation due to the aforementioned signal pressure supplied to the aforementioned control valve 5 at the time of gear shifting to the aforementioned second gear stage, and gear-shift-inhibition means 8 for inhibiting gear shifting to the aforementioned second stage in case at least one of abnormality in the pressure regulation and the abnormal operation is detected by the abnormality detecting means 7.

In the preferred embodiment of the present invention, accordingly, the first frictional engagement means 1 is supplied with oil pressure and then engaged at the gear shifting from first gear stage to second gear stage; wherein engaging pressure is regulated by pressure modulating valve 3. Although the pressure regulation level at that shift is set based on signal pressure from signal pressure output valve 4, if the signal pressure to be supplied to the pressure modulating valve 3 is missed due to failure in the switching valve 6, abnormality such as sudden engagement of the first frictional engagement means 1 will follow. In addition, since the aforementioned signal pressure is brought to the control valve 5, abnormal operation due to erroneous operation of the control valve 5 occurs. If such abnormalities as those in pressure regulation and in operation occur, the abnormality detecting means 7 detects them. And the gear shift inhibition means 8 inhibits gear shifting to the second gear stage, which is set up by engaging the aforementioned first frictional engagement means 1, based on the results of detection mentioned above. Therefore, abnormalities such as sudden engagement of the first frictional engagement means 1 and simultaneous engagements of both first and second frictional engagement means 1 and 2 are prevented beforehand together.

Again, in the preferred embodiment of the present invention, engine output reduction means 9 for reducing engine output may be adopted in place of or in addition to the aforementioned gear shift inhibition means 8.

By such a construction, since the engine output reduction means 9 reduces engine output when such abnormalities as those in pressure regulation and operation are detected by means of abnormality detecting means 7, excessive aggravation of shift shock is prevented owing to input torque thus reduced and deterioration of durability is prevented because input torque to respective frictional engagement means 1 and 2 is lowered even if abnormality occurs in engagement of the first frictional engagement means 1 when shifting to the aforementioned second gear stage is executed.

The preferred embodiment of the present invention may include learning control inhibition means 10 for inhibiting learning control for renewing the aforementioned pressure regulation level in places of the aforementioned gear shift inhibition means 8 and engine output reducing means 9 or together with them.

Therefore, by such a construction, since the learning control, which renews the pressure regulation level of the engaging pressure of the first frictional engagement means 1 based on the actual engagement status, is inhibited by the learning-inhibition means 10 in case of detection of the aforementioned abnormality by the abnormality-detecting means 7, erroneous renewal of pressure regulation level due to abnormal state where the pressure regulation failed will not occur and thereby abnormal pressure regulation during gear shift control thereafter will be prevented beforehand.

The present invention is explained hereafter in details referring to its preferred embodiment shown in FIGS. 2 through 14. An automatic transmission mechanism as a whole is schematically summarized first; as shown in FIG. 3, a gear train of the automatic transmission At in this example is of five-speed construction formed by combination of an auxiliary transmission mechanism Do in the front portion including overdrive planetary gear unit, and a main transmission mechanism Ma of four-forward and one-reverse-gear type including simply coupled three planetary gear trains; the gear train being coupled to a torque converter Tc including a lockup clutch Lu.

The auxiliary transmission Do includes a sun gear S0, a carrier C0, a ring gear R0, a one-way clutch F-0 located between the sun gear S0 and the carrier C0, a multi-disc clutch C-0 located in parallel with the one-way clutch F-0, and a multi-disc brake B-0 located in series with the multi-plate clutch C-0.

Figures 3, 4:
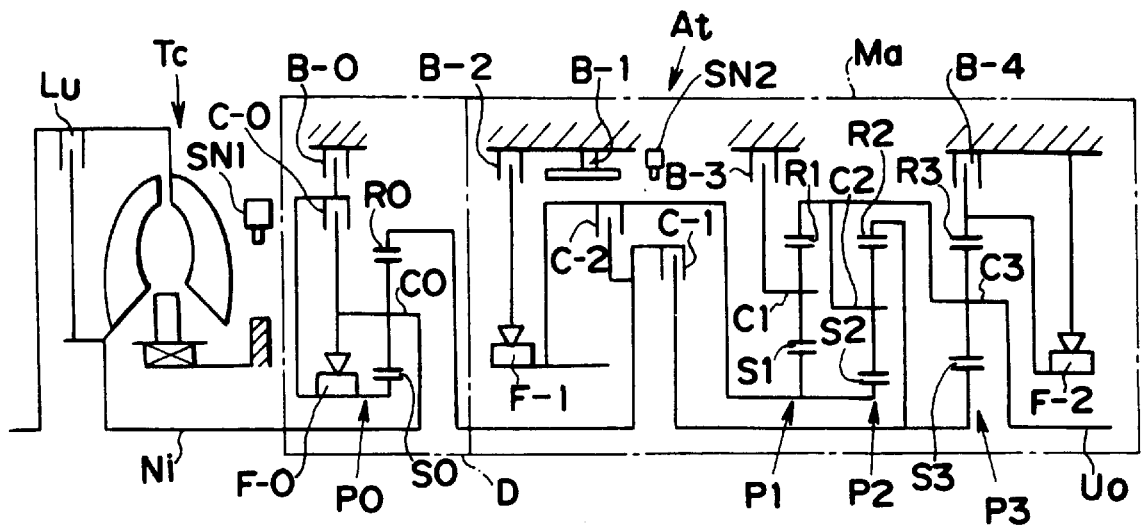
FIG. 3 is a skeleton showing an example of automatic transmission to which the present invention is applied.
FIG. 4 is a diagram showing application chart of frictional engagement means for setting respective gear stages of the automatic transmission shown in FIG. 3.

On the other hand, the main transmission mechanism Ma is composed mainly of simply coupled three sets of planetary gear units P1 through P3—one each including suitably direct-connected respective rotary elements such as sun gears S1 through S3, carriers C1 through C3, and ring gears R1 through R3—; wherein, regarding rotary elements in one each of the planetary gear units P1 through P3, multi-plate clutches C-1 and C-2, a band brake B-1, multi-disc brakes B-2 through B-4, and one-way clutches F-1 and F-2 are respectively arranged as shown in FIG. 3.

In addition, in the drawing, a reference letter SN1 represents C0 sensor for detecting rotation of a drum of the clutch C-0, a reference letter SN2 represents C2 sensor for detecting rotation of a drum of the clutch C-2. Further, although omitted in the drawing, one each of brakes and clutches is equipped with hydraulic servo apparatus including piston-cylinder mechanism for engaging/disengaging its frictional lining.

Figure 5:
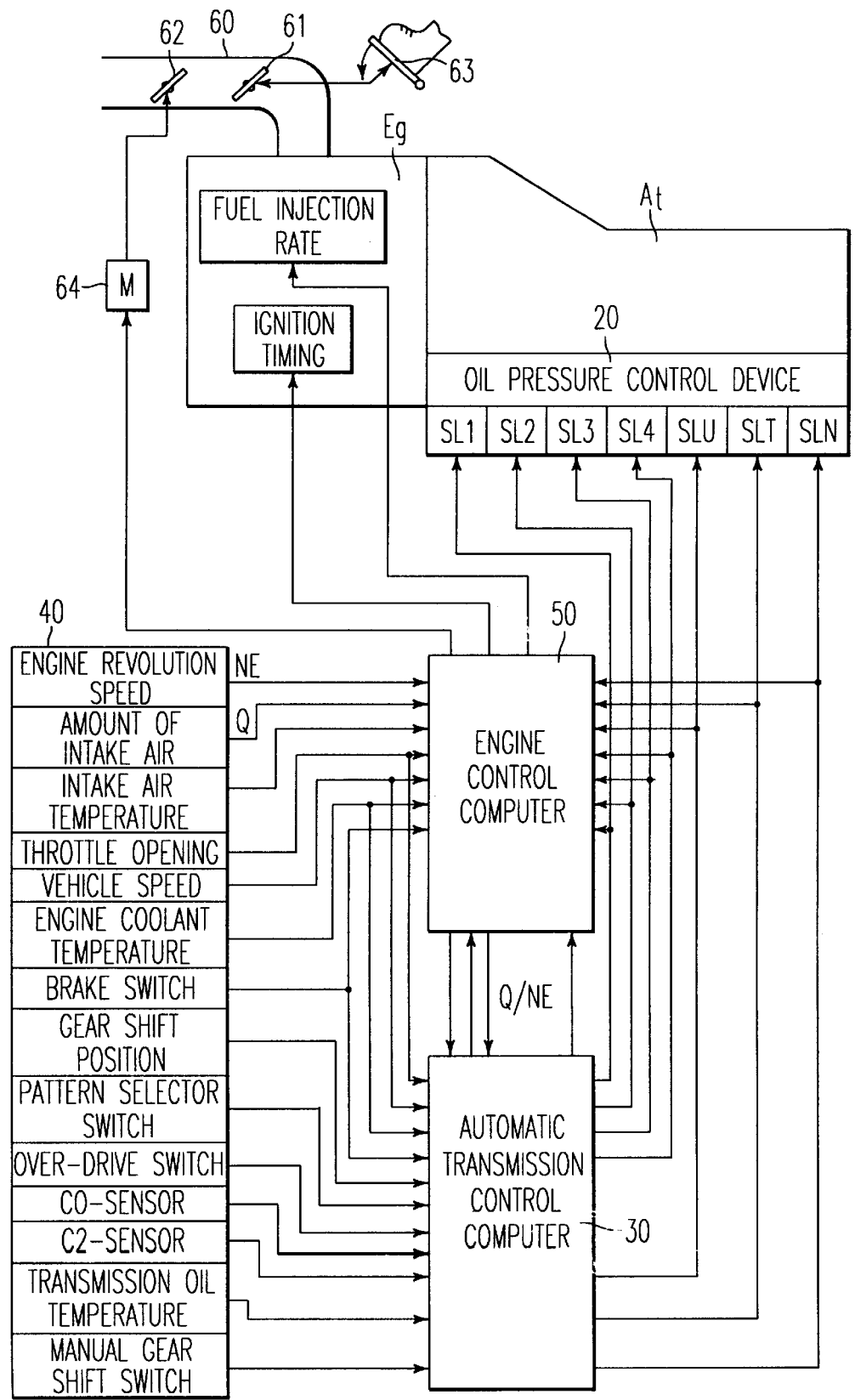
FIG. 5 is a block diagram showing control system applied to one of preferred embodiments according to the present invention.

As shown in FIG. 5, the automatic transmission At is equipped with the gear train constructed as described above, the torque converter, a hydraulic control apparatus 20 for controlling the lockup clutch, and an oil pump—omitted in the drawing—built into the gear train as an oil pressure source for the hydraulic system. The automatic transmission At is, when mounted in a vehicle, coupled with an engine Eg; of which an air intake manifold 60 is equipped with a main throttle valve 61, and a sub-throttle valve 62 in the upper stream to the main throttle valve 61. The main throttle valve 61 is connected to an accelerator pedal 63 and operated in accordance with stepping of the accelerator pedal 63; while the sub-throttle valve 62 is operated by a motor 64. In addition, an engine control computer 50 is provided for controlling the motor 64 and regulating amount of fuel injection into the engine Eg and ignition timing. The engine control computer 50 is composed mainly of a Central Processing Unit (CPU), memories (consisted of RAM and ROM) and an input/output interface.

The oil pressure control apparatus 20 of the aforementioned automatic transmission At is equipped with solenoid valves (SL1 through SL4) and linear solenoid valves (SLN, SLT and SLU) which are controlled by an automatic transmission control computer 30. The automatic transmission control computer 30 is composed mainly of a CPU, memories (consisted of RAM and ROM) and an input/output interface.

Moreover, at key positions throughout the vehicle including the engine Eg and the automatic transmission At are located various sorts of sensors 40. These various sensors 40 detect signals, for example, such as those of engine revolution speed, amount of air intake, intake air temperature, throttle valve opening, vehicle speed, engine cooling water temperature, brake switch, gear shift positions, a gear shift pattern selection switch, an over-drive switch, the C0 sensor, the C2 sensor, transmission oil temperature, and a manual gear shift switch; wherein the various sensors 40 are respectively connected to the automatic transmission control computer 30 and the engine control computer 50, meanwhile the automatic transmission control computer 30 and the engine control computer 50 are connected each other for mutual data communication.

In the automatic transmission At, output torque of the engine Eg shown in FIG. 5 is transmitted via the torque converter Tc shown in FIG. 3 to an input shaft Ni of the auxiliary transmission Do, and continuously rotates the carrier C0 connected to the input shaft Ni. Although the carrier C0 becomes united together with the sun gear S0 to form one unit when the clutch C-0 alone is engaged by the aforementioned hydraulic control apparatus 20, it becomes disconnected from an output shaft Uo to enter into neutral state when the other frictional engagement means are released.

The first forward gear stage is set up by engaging the clutch C-0 to bring the auxiliary transmission Do into directly connected state, together with engaging the clutch C-1 of the main transmission Ma and disengaging all other frictional engagement means. That is: driving torque transmitted to the ring gear R0 is transferred via above-mentioned clutch C-1 to the sun gear S3 of the planetary gear unit P3 and, with the reverse revolution of the ring gear R3 restrained by means of one-way clutch F-2, driving torque is outputted from the carrier C3 to the output shaft Uo at the first revolution speed.

The second gear stage (corresponding to the second gear stage in the present invention) is obtained, in addition, by having the auxiliary transmission Do directly connected and engaging the clutch C-1 and brake B-3 corresponding to the first frictional engagement means in the present invention. In this stage, input transmitted to the ring gear R2 of the planetary gear unit P2 in the similar way as in the case of the first gear stage mentioned above is transferred to the carrier C2 of the planetary gear unit P2 with having the carrier C1 of the planetary gear unit P1 as a reaction element and then to the ring gear R1 of the planetary gear unit P1 directly connected to the carrier C2, and finally is outputted to the output shaft Uo at the second revolution speed.

The third gear stage (corresponding to the first gear stage in the present invention) is obtained by having the auxiliary transmission Do directly connected in the same way as before and engaging the clutch C-1 and brake B-2 corresponding to the second frictional engagement means in the present invention and disengaging, in addition, other frictional engagement means. In this stage, the torque transmitted to the ring gear R2 of the planetary gear unit P2 in the similar way as in the case of the second gear stage is transferred to the carrier C2 with having the sun gear S2 as a reaction element, and finally is outputted to the output shaft Uo at the third revolution speed.

The fourth gear stage, in addition, is obtained by having the auxiliary transmission Do directly connected as mentioned above and engaging both clutches C-1 and C-2 together. In this stage, the transferred torque is inputted to the ring gear R2 and sun gear S2, thereby making the planetary gear unit P2 directly connected, thus the torque is outputted unchanged.

Whereas, the fifth gear stage is established by setting the main transmission Ma into the fourth gear stage mentioned above and, meanwhile, disengaging the clutch C-0 and engaging the brake B-0 thereby making the sun gear S0 fixed to set the auxiliary transmission Do in over-drive state.

The reverse gear, in addition, is accomplished by bringing the auxiliary transmission Do into the over-drive state mentioned above and engaging both the clutch C-2 and brake B-4 of the main-transmission Ma together. In this stage, torque transmitted to the sun gear S2 of the planetary gear unit P2 is outputted as a result of inverted revolution of respective carriers C2 and C3 of planetary gear units P2 and P3 by having the ring gear R3 as reaction element.

Operations of respective frictional engagement means and one-way clutches in the aforementioned various gear shift stages are respectively schematically summarized into an application chart shown in FIG. 4. In FIG. 4, blocks marked ○ represent engagement of brakes and clutches and locking of one-way clutches, meanwhile blocks marked ● represent engagement performed only in engine-braking, those marked ◎ represent engagement unconcerned with power transfer, and blank blocks represent released state.

Figure 2:
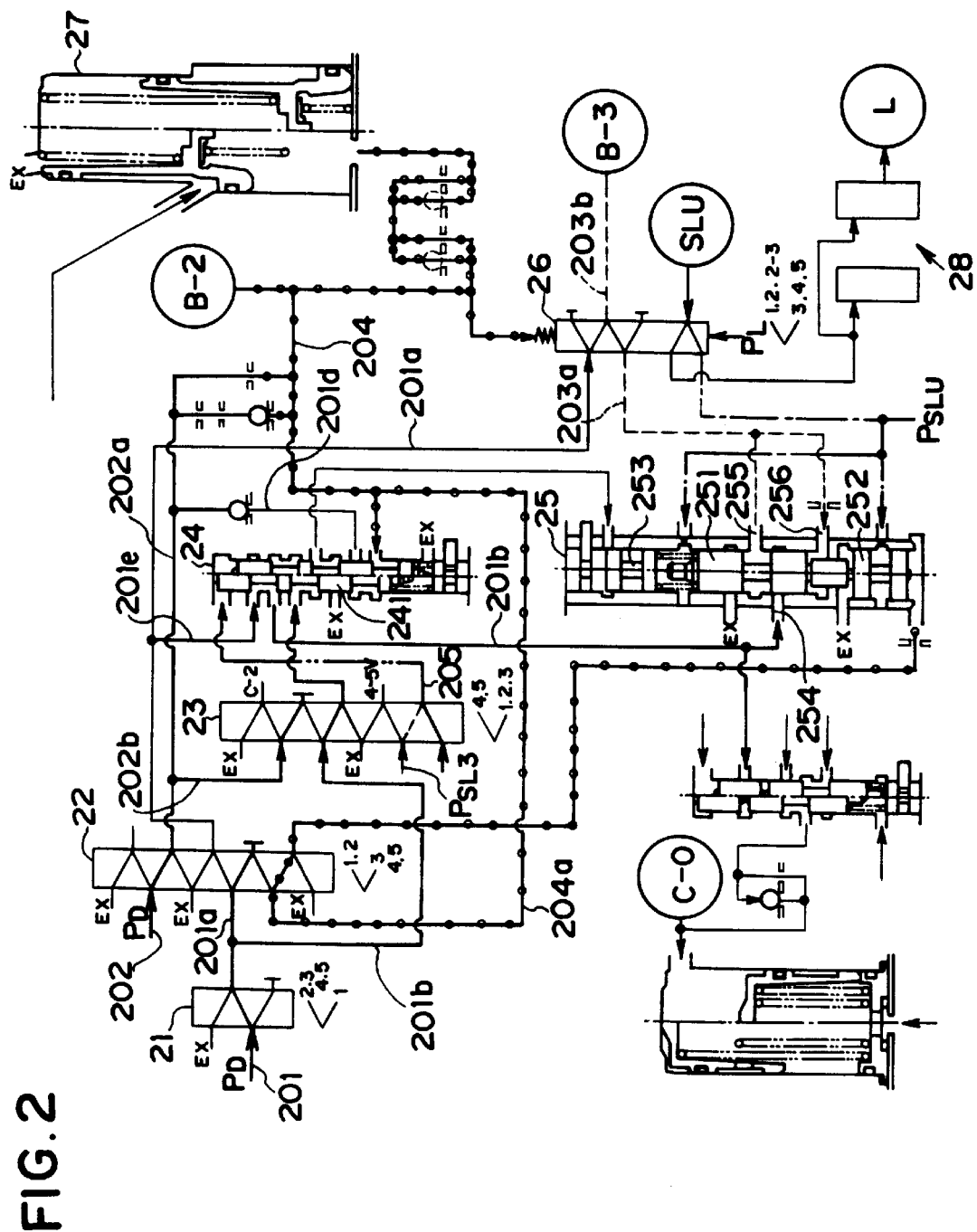
FIG. 2 is a diagram showing main part of the hydraulic circuit applied to one of preferred embodiments according to the present invention.

In the aforementioned automatic transmission At, as shown in FIG. 2, there are located in the oil pressure circuit directly relating to regulation of oil pressure and inlet/outlet of the hydraulic servo apparatus for engaging and disengaging frictional linings of the brakes B-3 and B-2 respectively corresponding to the first and second frictional engagement means according to the present invention; a 1-2 shift valve 21, a 2-3 shift valve 22, a 3-4 shift valve 23, a B-2 release valve 24, a B-3 control valve 25, a relay valve 26, and a B-2 accumulator 27. They are controlled as shown in FIG. 5 by the solenoid valves SL1 through SL4 for switching respective shift valves, the linear solenoid valve SLU for locking up, the accumulator control linear solenoid valve SLN for controlling the B-2 accumulator 27 and its back pressure, the linear solenoid valve SLT for providing control signal corresponding to engine loading, and so on.

The above-mentioned hydraulic circuit is equipped with: a first hydraulic passage 201*b* for supplying oil pressure to the brake B-3, a second hydraulic passage 202*a* for supplying oil pressure to the brake B-2, the 1-2 and 2-3 shift valves 21 and 22 delivering oil pressure selectively to the first and second hydraulic passages, and a B-3 control valve 25 located in the first hydraulic passage 201*b* and serving as a pressure modulating valve for regulating oil pressure in the first hydraulic passage 201*b* according to the engagement status of the brake B-2. In addition, the hydraulic circuit serves as a control apparatus that: delivering oil pressure to the first and second hydraulic passages 201*b* and 202*a* respectively through the 1-2 shift valve 21 and 2-3 shift valve 22 in the gear shift operation from neutral stage (N) to third gear stage (3rd), and in the gear shifting from second gear stage (2nd) to third gear stage (3rd), controlling discharge of oil pressure from the brake B-3 by the B-3 control valve 25 in accordance with engaging oil pressure for the brake B-2.

In addition, a B-2 release valve 24 is equipped in the first hydraulic pressure passage 201b in upper stream to the B-3 control valve 25. The B-2 release valve 24 shuts off, on the gear shifting from neutral(N) stage to third gear stage (3rd), the oil pressure supplied to the B-3 control valve 25 via the hydraulic passage 201b.

As for details of the B-3 control valve 25, it includes a spool 251 which, by having oil pressure as a feedback signal from the brake B-3 through a hydraulic passage 203a and loaded in the direction to close a port (upward in the drawing) and external control signal pressure PSLU (signal pressure output from linear solenoid valve SLU) loaded in the direction to open the port opposite to the above (downward in the drawing), regulates oil pressure to be supplied to the brake B-3 in accordance with above-mentioned oil pressure signals; and a plunger 252 which is located coaxially with the above spool 251 and, by having oil pressure acting on the brake B-2 loaded in the direction to close a port (upward in the drawing) on the occasion of so-called clutch-to-clutch shifting—wherein the brake B-2 is engaged while the brake B-3 being disengaged—and, at least in the above shifting, the signal pressure from the linear solenoid valve SLU loaded in the direction to open the port (downward in the drawing). Thereby, as seen above, the B-3 control valve 25 is constructed so that the plunger 252, by having the oil pressure of the brake B-2 loaded, becomes in contact with the spool 251 to operate in concert with the spool 251.

And the aforementioned 2-3 shift valve 22, on shifting from the second gear stage to the third gear stage, switches oil pressure supplied to the first hydraulic passage 201b and the second hydraulic passage 202a. Whereas, the 1-2 shift valve, on shifting from the second gear stage to the third gear stage, is held in a specified state and connects the first hydraulic passage 201b to the 1-2 shift valve 21 bypassing the 2-3 shift valve 22. Thereby oil pressure is supplied to the control valve 25 through the 1-2 shift valve 21, which is held in a specified position without being switched during the so-called clutch-to-clutch shift, and the hydraulic passage 201b. In addition, the relay valve 26 controlled by means of the oil pressure from the brake B-2 is positioned midway between the control valve 25 and the brake B-3.

As for details about connections between respective valves and hydraulic passages mentioned above, moreover, a D-range oil pressure line 201 connected to a manually operable valve—omitted in drawing—branches after passing the 1-2 shift valve 21 and a hydraulic passage 201a, one of the branches, is connected to the relay valve 26 through the 2-3 shift valve 22 and then connected to a hydraulic passage 203b for the brake B-3 through the relay valve 26. The hydraulic passage 201b, another one of the above branches on the other hand, is connected to the input port 254 of the B-3 control valve 25 through the 3-4 shift valve 23 and B-2 release valve 24 and then connected to the relay valve 26 from the B-3 control valve 25 through the hydraulic passage 203a.

Another D-range oil pressure line 202 connected to the manually operable valve branches after passing the 2-3 shift valve 22 and the hydraulic passage 202a, one of the branches, is connected to a hydraulic passage 204 for the brake B-2 through an orifice. The hydraulic passage 204 is connected to the hydraulic passage 202a through the B-2 release valve 24 and a check valve, and as well to the accumulator 27 through an orifice. The hydraulic passage 202b, another one of the branches on the other hand, is connected to the clutch C-2 through the 3-4 shift valve 23.

The 3-4 shift valve 23 is connected to the B-2 release valve 24 through a solenoid valve signal pressure line 20 (shown in FIG. 2 with double-dotted line) in order to load a signal pressure(PSL3) from the solenoid valve SL3 to the end portion of a spool of the B-2 release valve 24 in addition to connection and disconnection of the above-mentioned hydraulic passages 201b and 202b.

The B-2 release valve 24 is equipped so as to form a bypass to promote draining of oil pressure from the accumulator 27 at the ending part of releasing time of the brake B-2. The B-2 release valve 24, being equipped with a spool 241 loaded with an elastic force by a spring in one direction and being loaded with the signal pressure (PSL3) from the solenoid valve SL3 transmitted through the above 3-4 shift valve 23 on one end of the spool 241, is so devised as to operate: to connect and disconnect the path between a bypass 201d and the hydraulic passage 204 for the brake B-2; to switch the paths from the above D-range oil pressure line 201b to the input port 254 of the B-3 control valve 25 and to signal port at end portion of the plunger 253; and to connect and disconnect the path from a hydraulic passage 201e branched from another D-range oil pressure line 201a to the above first hydraulic line 201b. As seen above, thereby, two hydraulic passages for supplying D-range pressure (PD) to an input port 254 of the B-3 control valve 25 are formed: one leading to the B-2 release valve 24 through the 1-2 shift valve 22 and the hydraulic line 201b then passing through the first hydraulic line 201b to the input port 254; the other leading to the B-2 release valve 24 through the 1-2 shift valve 21 and the 3-4 shift valve 23, and then passing through the first hydraulic line 201b to the input port 254.

The B-3 control valve 25 is so constructed as to regulate oil pressure in hydraulic passage 203a connected to the output port 255 by means of its spool 252 of which an end portion is loaded with feedback pressure through the feedback signal pressure input port 256 in a way that one of two lands formed on the spool 251 acts in opening and closing the input port 254 and, meanwhile, the another land acts in opening and closing the drain port EX. The plunger 252 located coaxially with the spool 251 is of a differential piston type possessing a stroke range capable of, by means of the linear solenoid signal pressure (PSLU) loaded to a grooved portion of the plunger and brake line pressure in the hydraulic line 204a connecting to the hydraulic line 204 for the brake B-2 which is loaded through the 2-3 shift valve 22 to the end portion of the plunger, contacting to and separating from the spool 251. In the B-3 control valve 25, in addition, a plunger 253 for changing a pushing force by a spring acting on the spool 251 is equipped in the end space opposite to the plunger 252, and the plunger 253 is so devised as to be loaded and unloaded with the D-range pressure (PD), from the hydraulic line 201b through the B-2 release valve 24, on its end face.

The relay valve 26 is a spring-loaded switching valve of a spool type and its spool is loaded with oil pressure of the brake B-2 through the hydraulic passage 204 on the spring-loaded spool end meanwhile with the mine pressure (PL) on the other end, thereby switching the hydraulic lines 201a and 203a to be connected to the hydraulic line 203b leading to the brake B-3. In addition, the relay valve 26 is so devised that: the signal pressure PSLU from the aforementioned linear solenoid valve SLU is loaded to another valve 28 for controlling the lock-up clutch Lu in the situation when oil pressure for the brake B-2 is loaded, i.e. when the third or the higher gear stage is set; and the signal pressure PSLU is loaded to the B-3 control valve 25 as a signal pressure for setting the pressure regulation level in the situations the second or the lower gear stage is set wherein oil pressure is not acting on the brake B-2.

Figure 6:
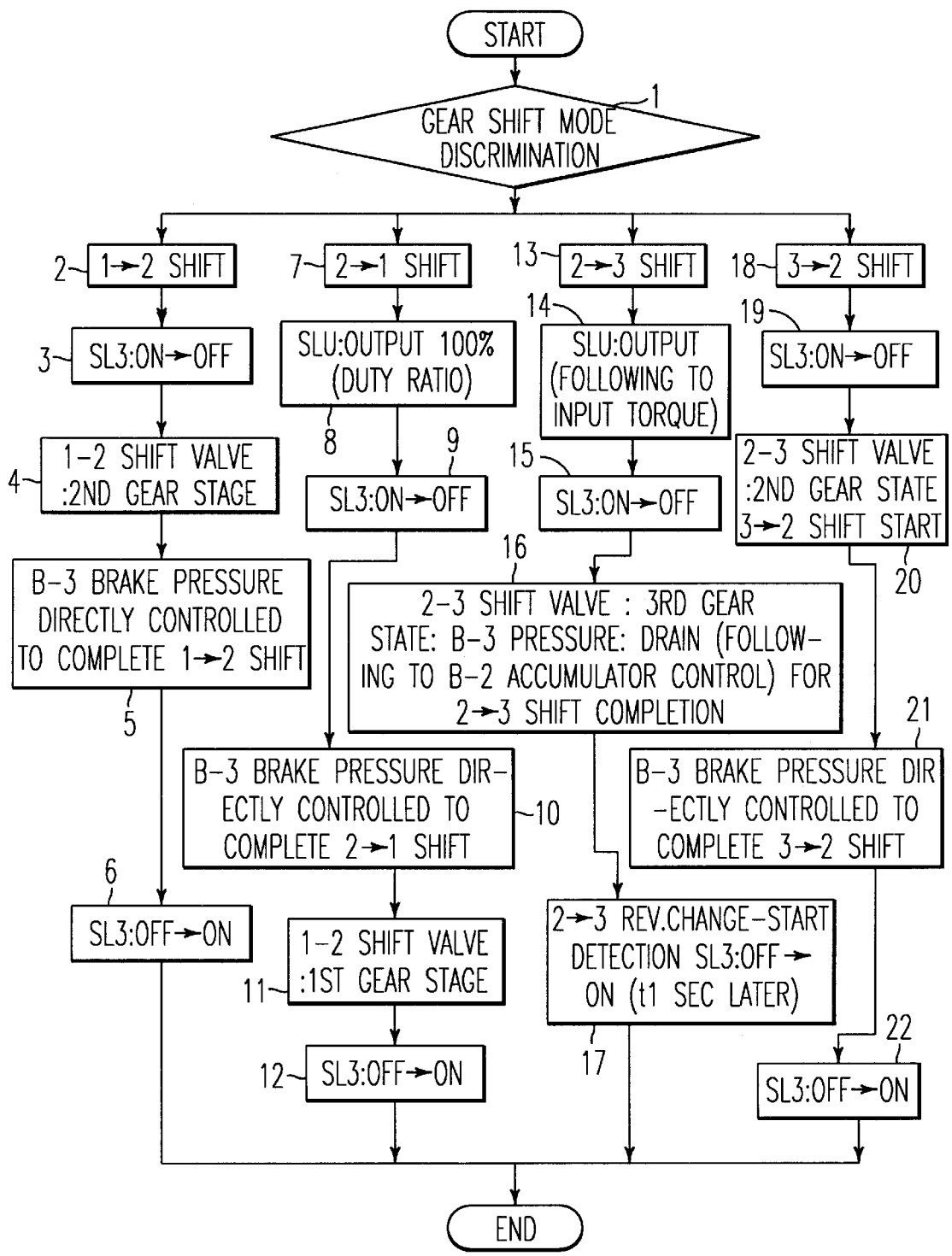
FIG. 6 is a flowchart showing one example of a control routine for gear shift to/from the second gear stage in the preferred embodiment according to the present invention.

Explanation of examples of gear shift control utilizing the hydraulic circuit composed as described above is given below referring mainly to a flow chart in FIG. 6 and timing charts in FIGS. 7 through 10.

(1) 1-2 gear shift control

Gear shift mode is examined in step 1. When gear shift is determined as 1-2 shift, gear shift instruction signal for executing the designated gear shift is generated in step 2, then in step 3, the solenoid valve SL3 is switched from ON to OFF preceding to switching 1-2 shift valve 21 to set the B-2 release valve 24 as shown with right half in FIG. 2. Thereby the B-3 control valve 25 is set up in pressure modulating mode. Next, in step 4, the 1-2 shift valve 21 is switched to second gear stage, and the D-range pressure (PD)—brought through manually operable valve (omitted in drawing), the hydraulic line 201, the 1-2 shift valve 21, the hydraulic line 201b, the 3-4 shift valve 23 and the B-2 release valve 24—is converted into B-3 brake pressure by means of B-3 control valve 25 then supplied to the hydraulic servo apparatus through the relay valve 26 and the hydraulic line 203b. And the clutch pressure C-0 is drained simultaneously.

Figure 7:
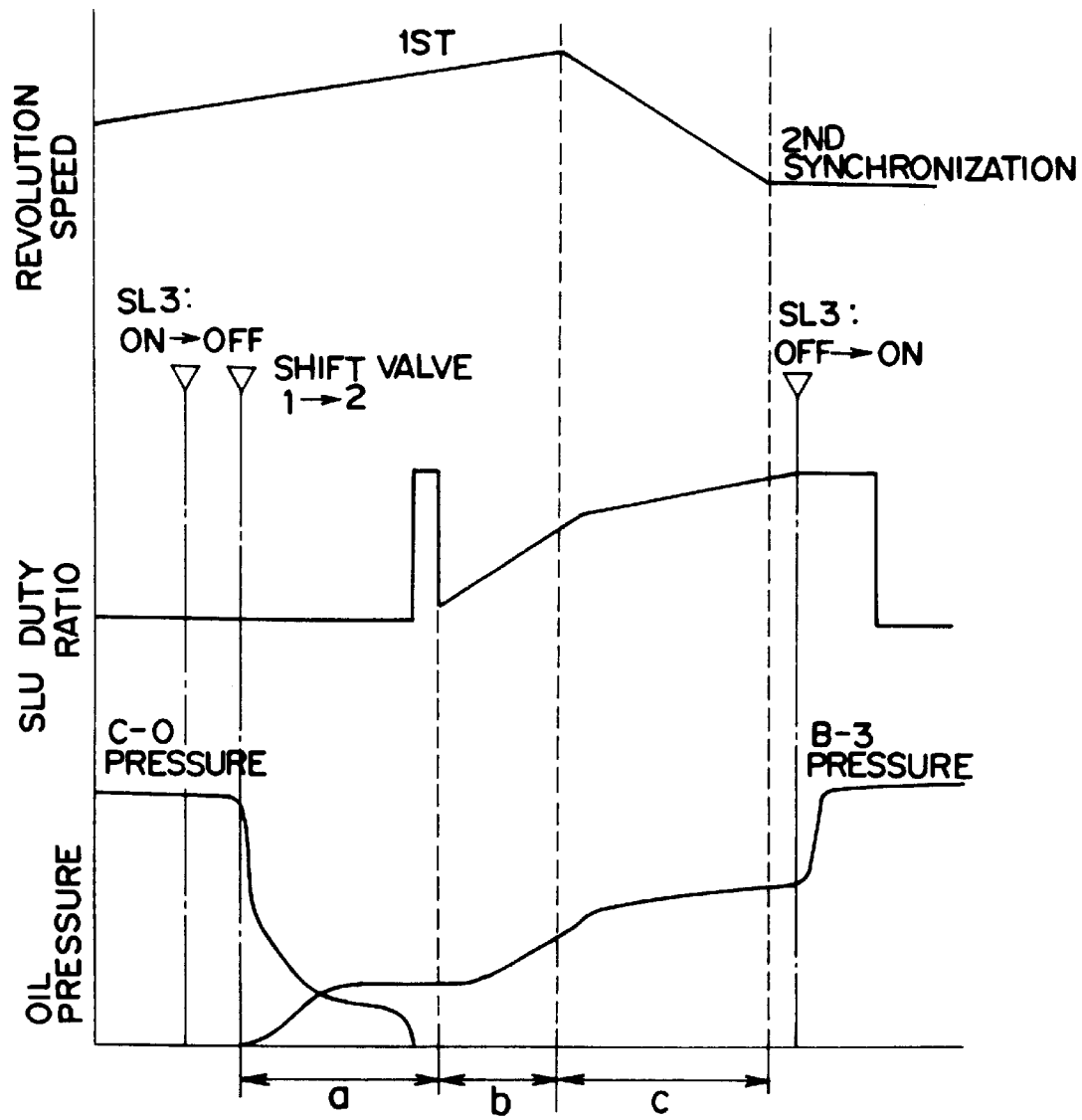
FIG. 7 is a timing chart of gear shifting from first gear stage to second gear stage in the preferred embodiment according to the present invention.

Thereafter, under control in step 5, the B-3 brake pressure is directly controlled by means of B-3 control valve 25 throughout zones shown marked "a" through "c" in FIG. 7. More specifically, in a state the piston of hydraulic servo apparatus is in the way of its stroke (zone "a"), hydraulic pressure level for fast fill is set up by means of its return spring. In zone "b", an output pressure from the linear solenoid valve SLU (PSLU) is ascended by a specified rate, causing revolution change. In zone "c", linear solenoid valve SLV is feedback-controlled in accordance with revolution change.

After end of the 1-2 gear shift (synchronization of second gear) is detected, the B-2 release valve 24 is switched in step 6 as shown with left half in FIG. 2 by setting the solenoid valve SL3 ON to release solenoid valve signal pressure (PSL3), and hereby the aforementioned D-range pressure (PD) brought through the B-2 release valve 24 is loaded to the plunger 253 of the B-3 control valve 25. Meanwhile, the brake pressure B-3 is rapidly raised to the line pressure (PL) level by continuous supply of the D-range pressure (PD) to a hydraulic servo apparatus through the B-2 release valve 24 switched from another route passing through the 2-3 shift valve 22 then the B-3 control valve 25, thereby making gear shift finished.

As a result of the above, in stable state of second gear stage (2nd), the plunger 253 of the B-3 control valve 25 is depressed by the line pressure (PL) and the spool 251 is locked at its lowermost position shown in FIG. 2. In addition, the signal pressure (PSL3) of the aforementioned solenoid valve SL3 is released and thereby the spool 241 of the B-2 release valve 24 is restored to its uppermost position shown in FIG. 2.

(2) 2-1 gear shift control

Figure 8:
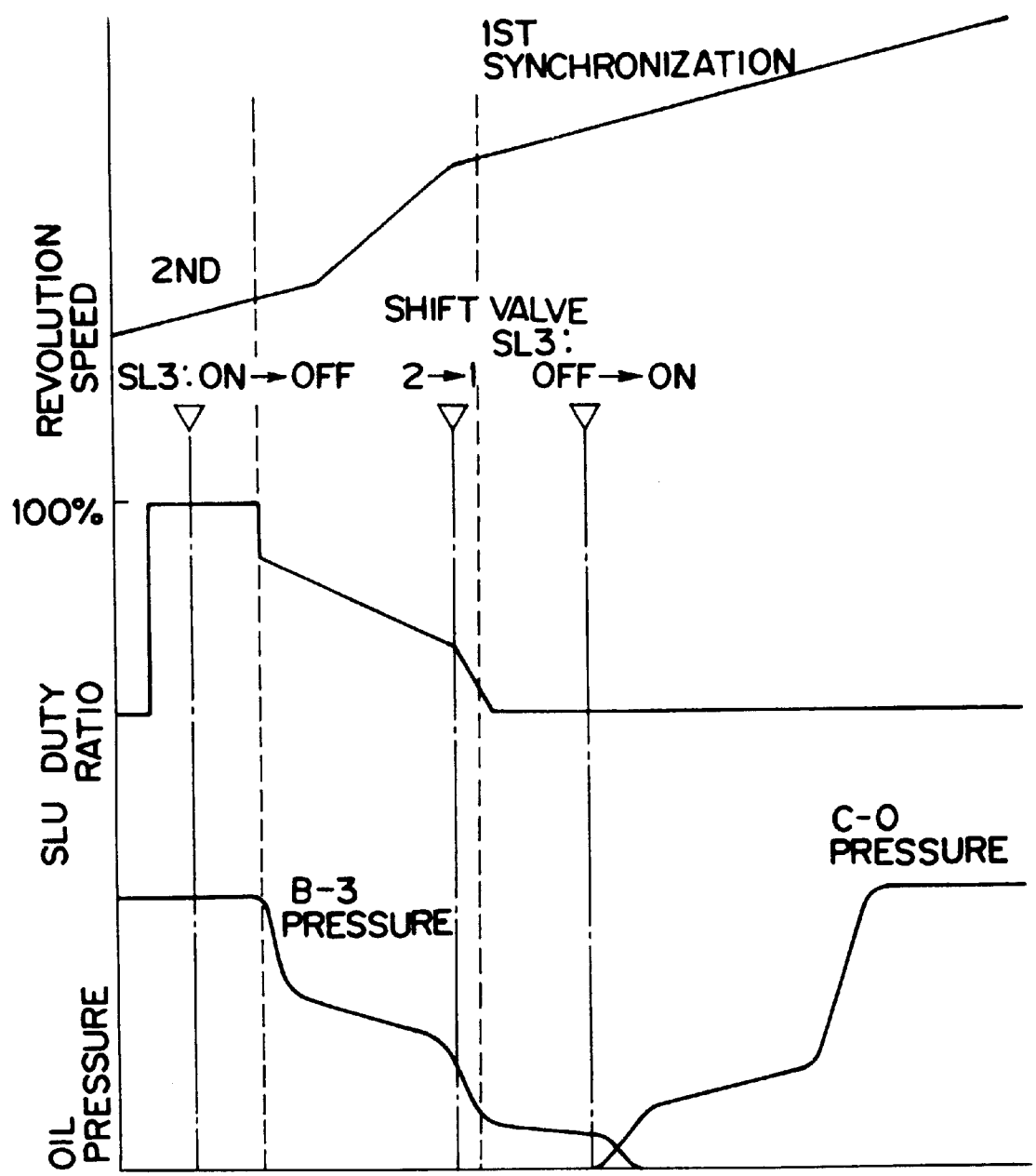
FIG. 8 is a timing chart of gear shifting from second gear stage to first gear stage in the preferred embodiment according to the present invention.

When the gear shift is determined in step 1 as 2-1 shift, a gear shift instruction signal for executing the designated gear shift is generated in step 7, then in step 8, an output of the linear solenoid valve SLU (duty ratio) is set to 100% as shown in FIG. 8 to prepare for drain control of the brake B-3. Next, in step 9, the B-2 release valve 24 is set as shown with right half in FIG. 2 by switching the solenoid valve SL3 from ON to OFF, and thereby making the B-3 control valve 25 unlocked; that is, the B-3 control valve 25 is set into pressure modulating mode. Thereafter, in step 10, the duty ratio of the linear solenoid valve SLU is controlled following to output a pattern for the 2-1 gear shift control, and a hydraulic pressure of the brake B-3 is directly controlled by the output pressure from the linear solenoid valve SLU to accomplish 2-1 gear shift.

In addition, after synchronization to the first gear stage (1st) is completed, the 1-2 shift valve 21 is switched, in step 11, to first speed state to shut off provision of the B-3 brake pressure. Finally in step 12, the solenoid valve SL3 is switched from OFF to ON and pressure supply for the clutch C-0 is started by switching a C-0 exhaust valve (omitted in drawing).

(3) 2-3 gear shift control

Figure 9:
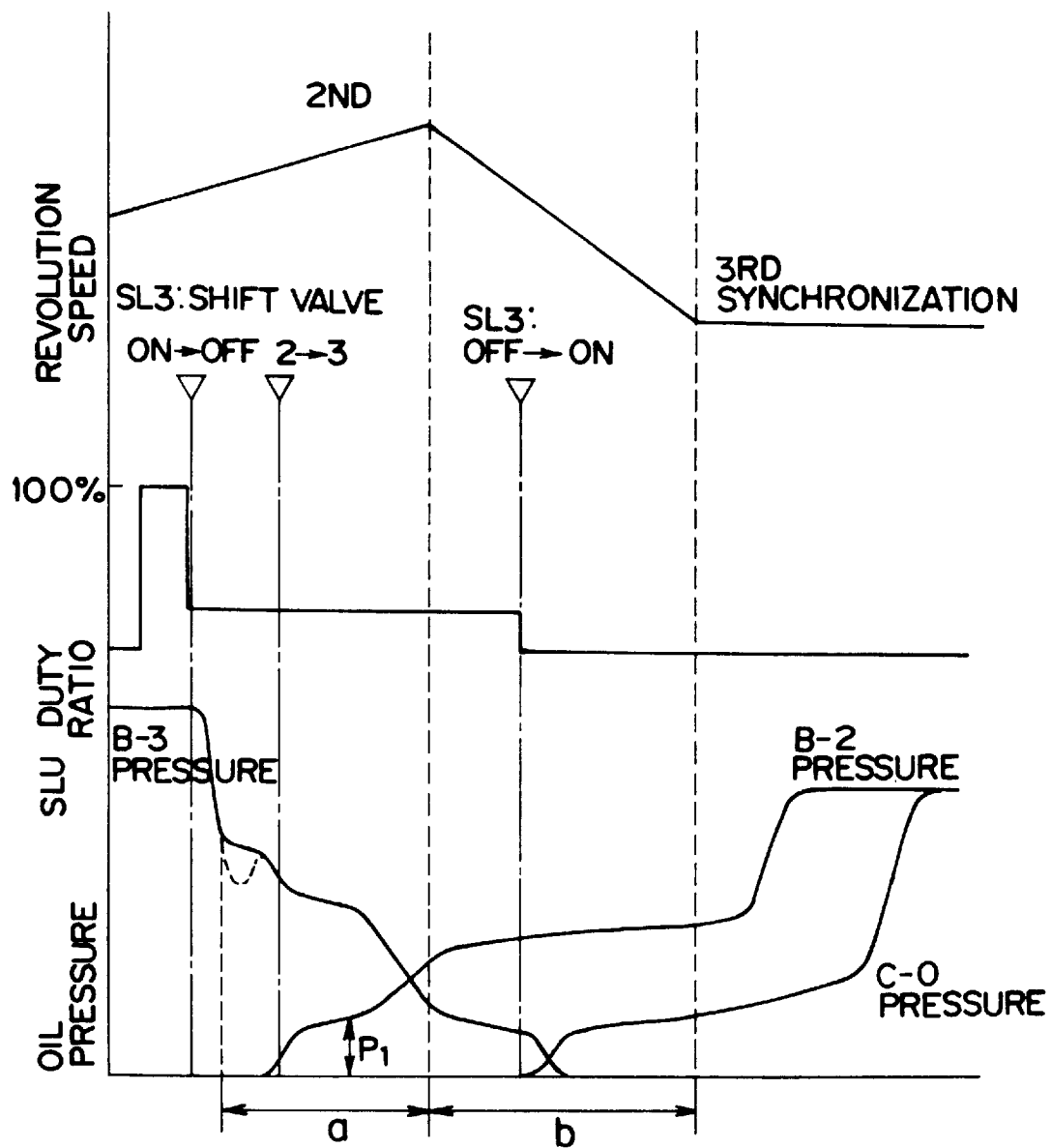
FIG. 9 is a timing chart of gear shifting from second gear stage to third gear stage in the preferred embodiment according to the present invention.

When the gear shift is determined in step 1 as 2-3 shift, a gear shift instruction signal for executing the designated gear shift is generated in step 13, simultaneously an output of the linear solenoid valve SLU is set to 100% as shown in FIG. 9, then in step 14, to an output level corresponding to input torque when the solenoid valve SL3 is switched from ON to OFF. Next, in step 15, the B-2 release valve 24 is set as shown with right half in FIG. 2 by switching the solenoid valve SL3 from ON to OFF, and line pressure loading to the end portion of plunger 253 is released by means of the B-2 release valve 24, thereby the B-3 control valve 25 is unlocked and set in pressure modulating mode. Thereafter in step 16, the 2-3 shift valve 22 is switched to position corresponding to third gear stage, thereby delivery of a D-range pressure (PD), brought through the 2-3 shift valve, to the hydraulic servo apparatus to provide the B-2 brake pressure is started.

After that, the B-3 brake pressure is regulated (zone "a") to the necessary minimum, by means of the B-3 control valve 25, in accordance with rise in the B-2 brake pressure. The inertia phase is feed back controlled (zone "b") by back pressure control of the B-2 accumulator 27. In step 17 in addition, in order to prevent simultaneous locking of the brakes B-2 and B-3, the solenoid valve SL3 is set ON later by t1 second by means of timer control, and delivery of the B-3 brake pressure is shut off by means of the B-2 release valve 24 then delivery of the C-0 clutch pressure is started. Moreover, upon completion of accumulation of the B-2 accumulator 27, the relay valve 26 is switched to shut off the hydraulic line for the brake B-3 and thereby the gear shift control is finished.

(4) Third speed gear stage (3rd)

The D-range pressure (PD) is loaded to the end portion of the plunger 253 through the 1-2 shift valve 21, the 3-4 shift valhe 23 and the B-2 release valve 24, also loaded to the end portion of the plunger 252 through the 2-3 shift valve 22; thereby, because of difference in pressure receiving areas between the plungers 252 and 253, both plungers together with the spool 251 are shifted upward depressing the spring and thereby locked together striking one another.

(5) 3-2 gear shift control

Figure 10:
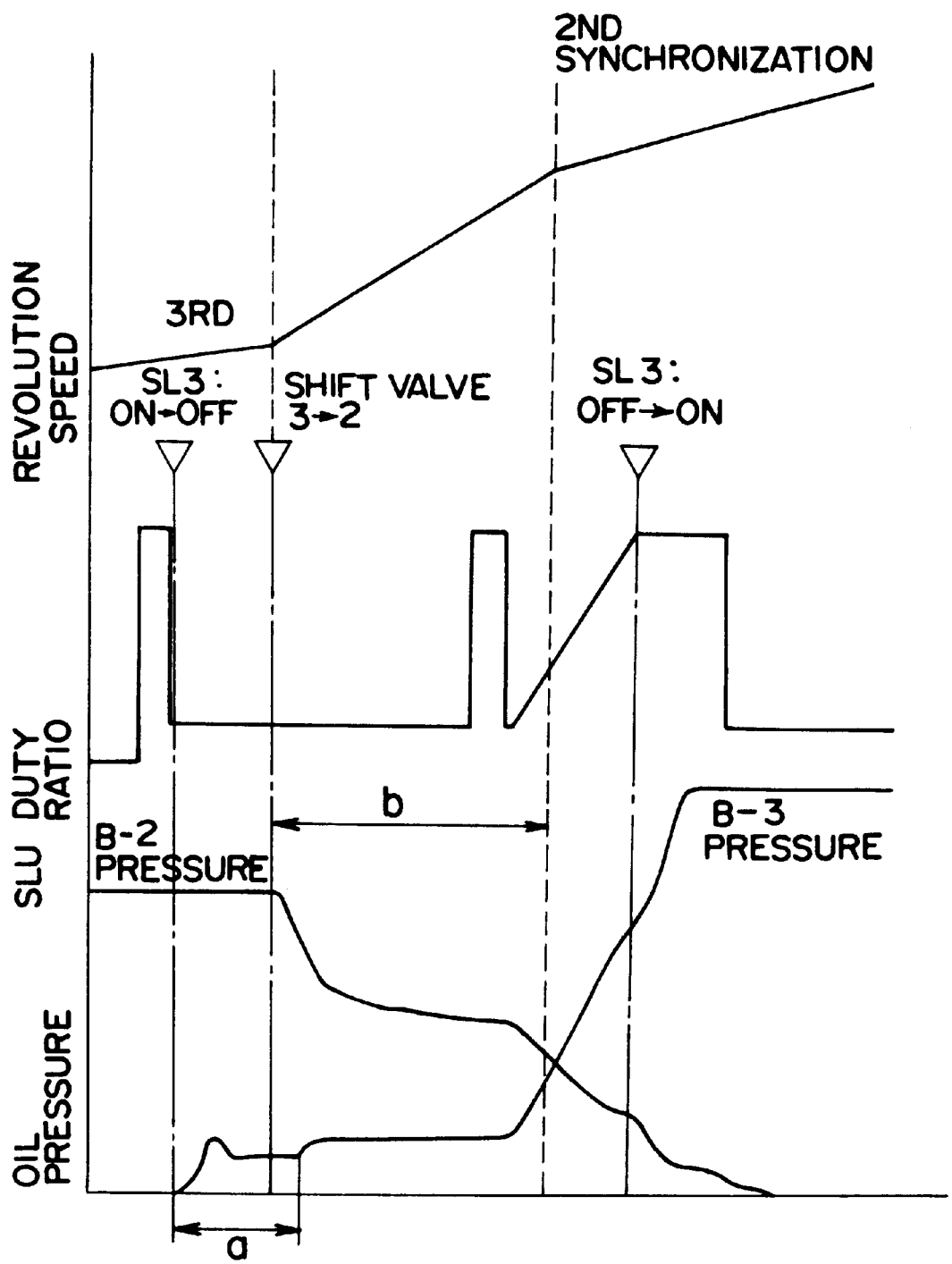
FIG. 10 is a timing chart of gear shifting from third gear stage to second gear stage in the preferred embodiment according to the present invention.

When the gear shift is determined in step 1 as 3-2 shift, a gear shift instruction signal for executing the designated gear shift is generated in step 18, and in step 19, B-2 release valve 24 is set as shown with right half in FIG. 2 by switching the solenoid valve SL3 from ON to OFF as shown in FIG. 10 preceding to switching of the 2-3 shift valve 22, then supply of oil pressure for the brake B-3 is started along with unlocking of the B-3 control valve 25, which thereby is set in pressure modulating mode. Thereafter, in step 20, the 2-3 shift valve 22 is switched to second gear stage to start draining of the B-2 brake pressure through a small orifice.

More concretely, by fast fill of the B-3 brake, piston stroke is finished (zone "a") preceding synchronization of second gear stage (2nd). In step 21, revolution speed alteration is controlled (zone "b") by back pressure control of the B-2 accumulator 27. In higher vehicle speed, the B-3 brake pressure is set on stand-by at low pressure level then raised in accordance with degree of synchronization for the second gear stage. In lower vehicle speed, synchronization is accomplished by gradually increasing the B-3 brake pressure while keeping the B-2 brake pressure unchanged. After synchronization of second gear stage (2nd) is accomplished, at step 22 the solenoid valve SL3 is switched from OFF to ON making the B-2 release valve 24 switched and thereby the brake B-2 is rapidly drained and the brake B-3 is rapidly engaged to finish the gear shifting.

(6) N-3 gear shift control

In this stage, because the spool 241 of the B-2 release valve 24 is shifted as shown in left half of the drawing—when the solenoid valve SL3 is set ON—by the draining signal pressure (PSL3) through the 3-4 shift valve 23 in 3rd speed state and also from the end portion of the spool 241 of the B-2 release valve 24 after passing through the solenoid valve signal pressure line 205, delivery of the D-range pressure (PD) to the B-3 control valve 25 through the hydraulic line 201b is shut off by means of the B-2 release valve 24. Resulted from the above, unnecessary operation of pressure regulation by the B-3 control valve 25 probable during starting period of rise in engaging pressure of the brake B-2, caused by the D-range pressure (PD) loaded to end portion of the plunger 253 through the 1-2 and 3-4 shift valves (21 and 23 respectively) and the B-2 release valve 24 and engaging pressure of the brake B-2 loaded as a signal pressure to the end portion of the plunger 252 through the 2-3 shift valve 22, will be eliminated; thereby occurrence of loss in flow is prevented beforehand.

According to control system following to above embodiment, because control by the relay valve 26 based on oil pressure from the brake B-2 (serving as second frictional engagement means) makes draining of oil pressure from the brake B-3 (serving as first frictional engagement means) possible regardless of operation of the control valve 25, prevention of enclosure of oil pressure of the brake B-3 is feasible even if the control valve 25 should stick in enclosure state.

In addition, in case the relay valve 26 sticks in a state of third or higher gear stage, the D-range pressure (PD) is supplied from the 2-3 shift valve 22 and through the oil line 201e then to the brake B-3 through the oil line 203b if second gear stage is set up, thereby second gear stage setting can likely be carried out. In such a case like this, since the signal pressure PSLU from the linear solenoid valve SLU is supplied to the control valve 28 for the lockup clutch Lu through the relay valve 26 to engage the lockup clutch Lu, control system according to the present invention executes judgment on failure due to stick in the relay valve 26 and performs failure control based on the judgment as following.

Figure 11:
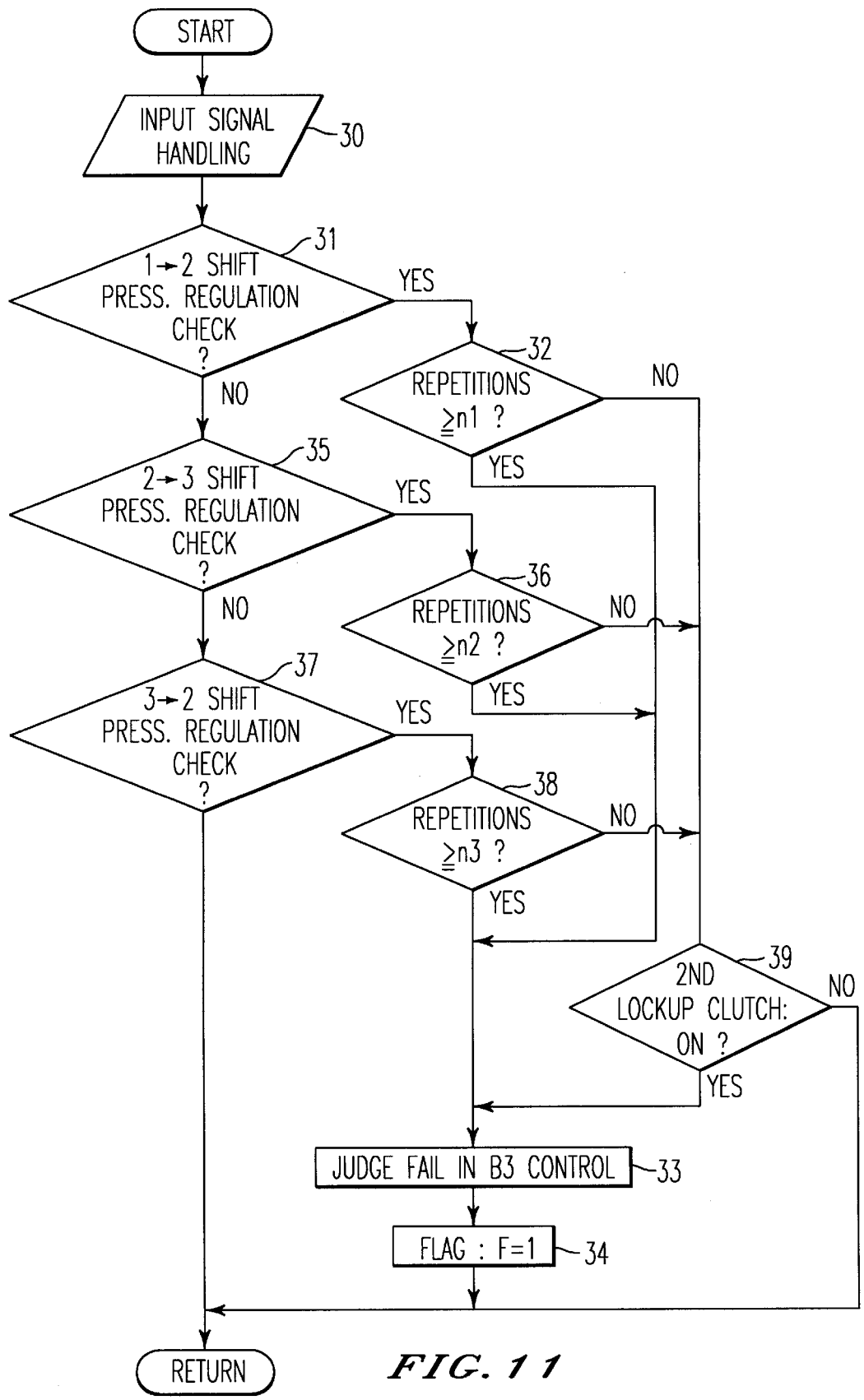
FIG. 11 is a flowchart showing an example of fail-judgment routine in brake control system for setting second gear stage in the preferred embodiment according to the present invention.

FIG. 11 is a flow-chart schematically showing a routine for judgment on failure, wherein after handling input signals (step 30), abnormality in pressure regulation at 1-2 gear shift operation—one of gear shift by engaging the brake B-3—is examined (step 31). The examination can be performed, for example, based on difference between actual revolution speed changing pattern during gear shifting and usual revolution changing pattern.

In case that an abnormality in pressure regulation is detected and the number of its repetitions is found reaching a predetermined value n1 ("YES" in step 32), judgment is made (step 33) revealing occurrence of failure in the brake B-3 control routine and flag F is set to "1" (step 34). Reason why the judgment on failure is delayed until the number of repetitions of abnormal pressure regulation reaches a predetermined value n1 is for the sake of prevention of misjudgment. Therefore, the value n1 may be set up within a range enough to ensure reliable judgment of abnormal pressure regulation.

In case abnormality in pressure regulation at 1-2 gear shift is not detected (in case of "NO" in step 31), examination is carried out based on whether abnormality in pressure regulation is detected at 2-3 gear shift operation or not (step 35). This examination is carried out based on, for example, deviation of draining characteristics of the brake B-3 from usual draining characteristics, i.e. abnormality is examined by detecting overshoot of input revolution NC0. On occasion abnormality in pressure regulation at 2-3 gear shift is detected and the number of its repetitions reaches a predetermined value n2 ("YES" in step 36), the control routine proceeds to above-mentioned steps 33 and 34 to make judgment on the failure.

In case abnormality in pressure regulation at 2-3 gear shift is not detected (in case of "NO" in step 35), moreover, examination is carried out based on whether abnormality in pressure regulation is detected at 3-2 gear shift operation or not (step 37). This examination can be carried out based on, for example, oil pressure supply characteristics to the brake B-3 in the light of revolution change of the input shaft or the like. On occasion abnormality in pressure regulation at 3-2 gear shift is detected and the number of its repetitions reaches a predetermined value n3 ("YES" in step 38), the control routine proceeds to above-mentioned steps 33 and 34 to make judgment on the failure. Meanwhile, in case abnormality in pressure regulation at 3-2 gear shift is not detected and examination in step 37 results in "NO", the routine terminates to return.

Moreover, on occasion abnormal pressure regulation is detected in any one of above gear shift operations but the number of its repetitions is not reaching any one of predetermined values n1, n2 or n3—i.e. in case judgments in steps 32, 36 and 38 resulted in "NO"—, the control routine proceeds to step 39 to examine whether the lockup clutch Lu is engaged in second gear stage. Examination can be made here by examining whether engine revolution speed NE and input revolution speed of the automatic transmission At (revolution speed of turbine therein) are equalized. On occasion these are found equalized in revolution speed, i.e. in case judgment resulted in "YES" in step 39, since thereby abnormal state wherein the signal pressure PSLU from the linear solenoid valve SLU is not supplied to the B-3 control valve 25 is suspected, the control routine proceeds to steps 33 and 34 to make judgment on the failure.

As mentioned before, the relay valve 26 is a switching valve for switching destinations of the signal pressure PSLU from the linear solenoid valve SLU between the control valve 28 for controlling of the lockup clutch Lu and the B-3 control valve 25. Accordingly, since engagement of the lockup clutch Lu means that the signal pressure PSLU is loaded to the control valve 28 for controlling the lockup clutch Lu contrary to the B-3 control valve 25 to be loaded with the signal pressure PSLU in the normal state in the second shift and that engagement of the lockup clutch Lu is resulted from stick in the relay valve 26, judgment is made on the failure.

As can be understood from the above, bases of judgments in above-mentioned steps 31, 32, 35, 36, 37 and 38 correspond to abnormal pressure regulation referred to in the system according to the present invention or in the system shown in FIG. 1; meanwhile, basis of judgment in step 39 corresponding to abnormal operation referred to in the system according to the present invention or in the system shown in FIG. 1, and steps 33 and 34 corresponding to abnormality-detecting means in the system according to the present invention or in the system shown in FIG. 1.

Figure 12:
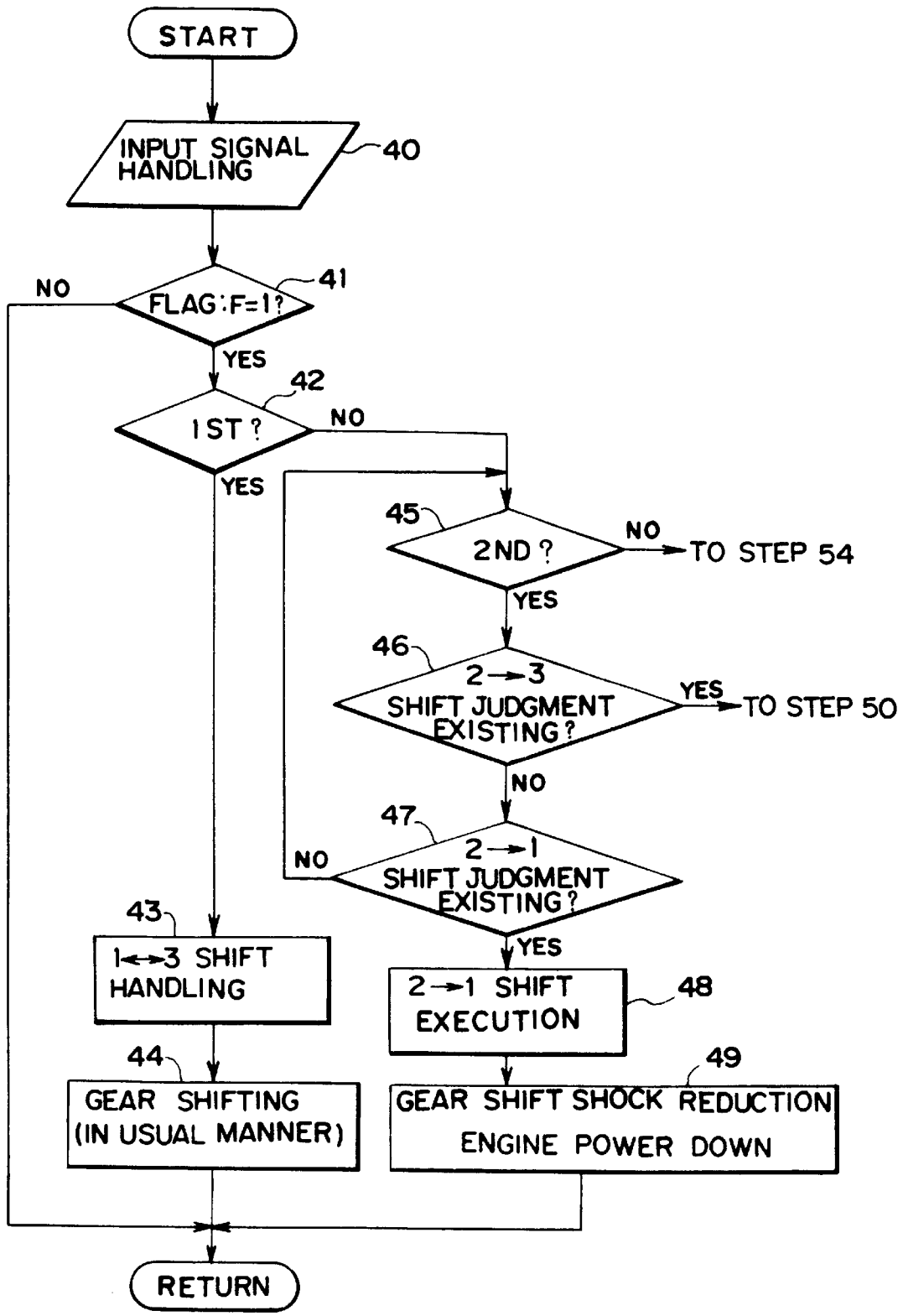
FIG. 12 is a diagram partially showing an example of flowchart of control routine to be executed in a case fail is determined in the preferred embodiment according to the present invention.
Figure 13:
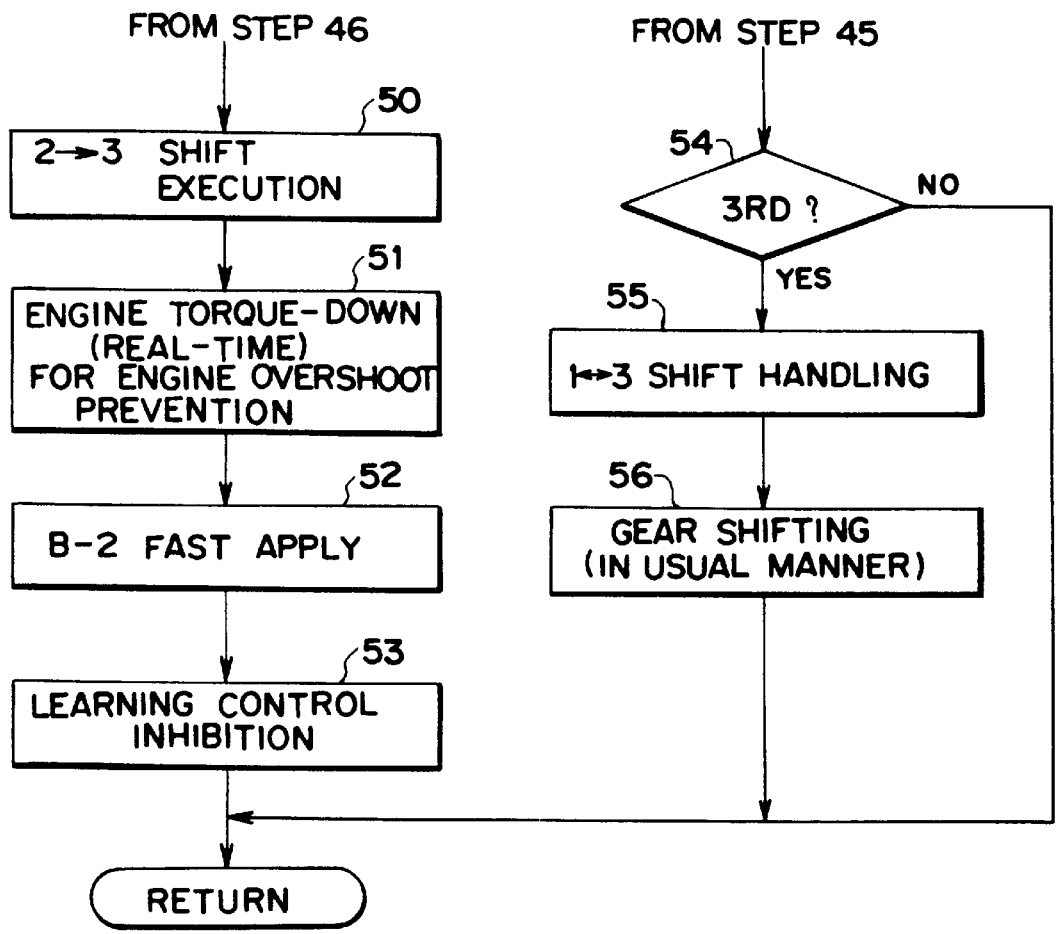
FIG. 13 is a diagram showing another part of the flowchart which is partially shown above in FIG. 12.

FIGS. 12 and 13 illustrate a control routine to meet a case of failure determined in a control system of the brake B-3 as mentioned above, and in the routine, input signals are handled (step 40) and then whether flag F is set to "1" or not is examined (step 41). As the flag is to be set to "1" when there occurs a failure in control system for the brake B-3, the routine will terminate to return when result of step 41 is "NO"; whereas if "YES", since occurrence of failure is meant thereby, examination about whether existing gear stage is of the first gear stage or not is carried out first (step 42).

If the first gear stage is set, 1-3 gear shift operation is carried out (step 43). This operation is, for example, a control for switching to gear shift map with area for setting-up of second gear stage excluded, thereby finally inhibiting gear shift to the second speed gear stage wherein the brake B-3 having abnormality in its control might be engaged. Succeeding the above, ordinary control operation is then applied to remaining gear stages (step 44).

If it is found in step 42 that the first gear stage is not set, whether second gear stage is set is examined (step 45). If second gear stage is set, whether judgment about 2-3 gear shift operation ever made is examined (step 46). If this judgment is not approved, existence of judgment about 2-1 gear shift operation is examined (step 47). If this judgment is approved, 2-1 gear shift operation is carried out (step 48). Along with the gear shift, in addition, engine torque-down control is carried out (step 49) in order to mitigate gear shift shock. As for detail, retarded angle control of ignition timing of the engine is performed and the fuel injection rate is reduced together with or instead of the ignition timing control. Meanwhile, in case that judgment in step 47 is "NO", the control routine returns to step 45.

In case the judgment about 2-3 gear shift is approved and the judgment in step 46 resulted in "YES", in addition, 2-3 gear shift is executed (step 50) and real-time control for engine torque-down is executed (step 51) in order to prevent engine overshoot. Contents of this control is similar to those in step 49. That is: because, in case of aforementioned abnormality in control system for the brake B-3, input revolution speed NC0 tend to rise rapidly by rapid draining of the brake B-3, engine torque-down control is performed in order to prevent rapid rise in revolution speed mentioned above.

Moreover, under aforementioned failure, because oil pressure is rapidly drained during gear shift from second to third gear stage and likely resulting in so-called under-lap state wherein the brake B-3 together with brake B-2 for setting up third gear stage fall into released state, oil pressure is rapidly supplied to the brake B-2 in order to take as great effort as possible for preventing the under-lap (step 52). This can be performed, for example, by raising back pressure of the accumulator 27 or the like manner.

As engaging pressure of the brake B-3 is controlled by adjusting pressure regulation level of the B-3 brake control valve 25 by means of the linear solenoid valve SLU, appropriate control without being affected by aging deterioration and/or individual difference of frictional material is achieved by learning control of the pressure regulation level in accordance with course of engine overshoot and/or tie-up condition. However, since oil pressure supplied to or drained from the brake B-3 is not controlled under such state of failure as mentioned above and thereby state during gear shift under such circumstances is so-called abnormal state, acceptance of such conditions into learning control causes abnormality in succeeding control activities. Therefore, inhibition control of the learning control is executed in step 53.

In case second gear stage is not set thereby the judgment in step 45 resulting in "NO", in addition, whether third gear stage is set or not is examined (step 54). In case third gear stage is not set, control routine terminates to return; whereas in case third gear stage is set, 1-3 gear shift is carried out (step 55) then usual control for remaining other gear stages is executed (step 56). The above controls are similar to those carried out in aforementioned steps 43 and 44, and is, for example, a control for inhibiting gear shift to second gear stage—requiring the brake B-3 having abnormality in its control system is to be engaged—by switching to a gear shift map with area for setting-up of second gear stage excluded.

Figure 14:
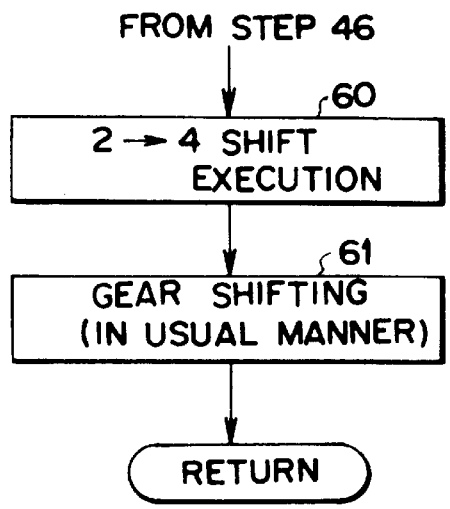
FIG. 14 is a partial flowchart showing control steps applicable to the control system of preferred embodiment according to the present invention when so constructed as to avoid clutch-to-clutch shift.

Besides, above-mentioned gear shift between second and third gear stages in automatic transmission is clutch-to-clutch gear shift wherein both brakes B-2 and B-3 are switched between engaged and released states, and thereby the gear shift control is a control inherently having difficulties in it. Therefore, the gear shift control may be so constructed that: in case judgment on gear shift from second gear stage to third gear stage is approved at step 46 in FIG. 12, gear shift to fourth gear stage, for instance, in stead of third gear stage is carried out (step 60) as shown in FIG. 14 without executing routine shown in FIG. 13; then usual gear shift control for remaining other gear stages is carried out (step 61).

As can be understood from the above, the above-mentioned steps 43 and 55 correspond to gear shift inhibition means referred to in the system according to the present invention or in the system shown in FIG. 1, step 49 corresponds to engine torque-down means, and more, step 53 corresponds to learning control inhibition means.

As detailed above, control system according to the present invention makes judgment on failure of control routine for the brake B-3 based on abnormal pressure regulation or its relating abnormal operation unusual, and, based on the judgment, selectively executes inhibition of gear shift, reduction of engine output, and inhibition of learning control of pressure regulation level. Thereby the control system effectively prevents: aggravation of gear shift shock and deterioration of durability due to excessive slip of frictional linings, caused by delivery of oil pressure not regulated; or, aggravation of gear shift shock and engine overshoot, caused by incorrectness in pressure regulation level. Especially, hitherto mentioned control system makes judgment even on an abnormal engagement of the lockup clutch during a gear shift not requiring lockup clutch engagement, making rapid judgment on failure possible, accordingly rapid countermeasure against failure as well, leading to effective prevention of deterioration of durability of frictional engaging means.

Meanwhile, although description is given and illustrated in the aforementioned embodiment exemplifying a control system applied to an automatic transmission equipped with a gear train shown in FIG. 3, however, the present invention is not restricted to the aforementioned embodiment: the control system is also applicable to those automatic transmissions equipped with gear trains of other than those shown in FIG. 3. Accordingly, gear shift-inhibition means may be so devised as to inhibit gear shift to either one gear stage in clutch-to-clutch shift other than that carried out between second and third gear stages.

In addition, pressure modulating valve is not restricted to the aforementioned B-3 control valve but may be of other suitable pressure modulating valve, accordingly signal pressure for setting pressure regulation level of the pressure modulating valve is not restricted to the output pressure from aforementioned linear solenoid valve. Moreover, any valve other than the aforementioned relay valve may be used as a switching valve for switching the loading of the signal pressure, for pressure regulation level setting, between pressure modulating valve and other control valve. Furthermore, since control valve for the purpose of the above is not restricted to those valves for controlling the lockup clutch, the abnormal operation the present invention applies to may be any unusual operation besides engagement of the lockup clutch.

As for general description of merits achieved by the control system according to the present invention, since the control system according to the present invention makes judgment based on an abnormality in pressure regulation of engaging pressure for frictional engagement means relating to clutch-to-clutch shift and abnormal operation affected by the control valve working on signal pressure for setting the pressure regulation level—now directed to the control valve—, thereby abnormality in gear shift control to which the frictional engagement means relating can be rapidly and yet precisely detected. In addition, when the abnormality is detected, since shifting to the gear stage requiring the frictional engagement means engaged is inhibited, occurrence of gear shift under abnormal state is removed and thereby aggravation of gear shift shock and deterioration of durability, caused by excessive loading to frictional engagement means and/or slip of frictional engagement means, are prevented.

In addition, by the present invention, especially, since engine torque-reduction is executed upon detection of an abnormal pressure regulation and/or an abnormal operation by abnormality-detecting means, not only engine overshoot but also aggravation of gear shift shock and deterioration of durability of frictional engagement means are prevented.

Moreover, by the present invention, in case that abnormnality-detecting means detects abnormal pressure regulation or abnormal operation, learning control of pressure regulation level is inhibited. Therefore, renewal of pressure regulation level based on abnormal state wherein pressure regulation activity is missing is suppressed, thereby abnormal control resulted from escalation of abnormality in engaging pressure of frictional engagement means is prevented in subsequent gear shift control.

We claim:

1. An automatic transmission control system equipped with first frictional engagement means which is engaged in a gear shift from specified certain first gear stage to specified another certain second gear stage, second frictional engagement means which is disengaged in the gear shift, a pressure modulating valve for regulating engaging pressure to be supplied to the first frictional engagement means, a signal pressure output valve for providing signal pressure to modify pressure regulation level of the pressure modulating valve, wherein said automatic transmission further comprises:

a switching valve which puts engaging pressure regulated by the pressure modulating valve to the first frictional engagement means along with putting the signal pressure to the pressure modulating valve in normal state and in addition puts engaging pressure supplied from another oil pressure source to the first frictional engagement means along with putting the signal pressure to a control valve other than the pressure modulating valve in case of failure;

abnormality-detection means for detecting, in case of gear shift to the second gear stage, both an abnormality in pressure regulation of engaging pressure to be supplied to the first frictional engagement means and an abnormality in operation due to delivery of the signal pressure to the control valve, and gear shift-inhibition means for inhibiting gear shift to the second gear stage in case that the abnormnality-detection means detects at least one of the abnormalities in pressure regulation and in operation.

2. The automatic transmission control system according to claim 1, wherein the signal pressure output valve includes a valve for providing signal pressure corresponding to duty ratio.

3. The automatic transmission control system according to claim 1, further comprising; a torque converter located at input end of the automatic transmission and a lockup clutch built in the automatic transmission, wherein the control valve includes a valve for controlling engage/disengage of the lockup clutch based on the signal pressure provided by the pressure modulating valve.

4. The automatic transmission control system according to claim 3, wherein the abnormality-detection means comprises a means for detecting an abnormality in pressure regulation of engaging pressure to be supplied to the first frictional engagement means and abnormality in engagement of the lockup clutch.

5. The automatic transmission control system according to claim 1, wherein the abnormality-detection means comprises a means for making a judgment on abnormality by detecting a predetermined certain plural number of repetitions of the abnormality in pressure regulation.

6. The automatic transmission control system according to claim 1, wherein the abnormality-detection means comprises a means for making judgment on abnormality in pressure regulation based on a rise in the input revolution speed transmitted to the automatic transmission.

7. The automatic transmission control system according to claim 1, wherein the gear shift-inhibition means comprises a means for replacing a gear shift instruction map, providing areas for respective gear stages corresponding to vehicle running conditions, with a gear shift instruction map excluding area for the second gear stage.

8. The automatic transmission control system according to claim 1, further comprising engine torque-reduction means for reducing engine torque when the abnormality-detection means detects at least one of the abnormalities in pressure regulation and in operation.

9. The automatic transmission control system according to claim 8, wherein the engine torque-reduction means comprises a means to carry out at least one of operations including retarded angle control of ignition timing and fuel injection reduction.

10. The automatic transmission control system according to claim 1, further comprising learning control means for carrying out learning control for renewing pressure regulation level of the pressure modulating valve on basis of actual state of control, and learning control-inhibition means for inhibiting the learning control when the abnormality-detection means detects at least one of the abnormalities in pressure regulation and in operation.

11. The automatic transmission control system according to claim 1, further comprising; engine torque-reduction means for reducing engine torque when the abnormality-detection means detects at least one of the abnormalities in pressure regulation and in operation, learning control means for carrying out learning control for renewing pressure regulation level of the pressure modulating valve on basis of actual state of control, and learning control-inhibition means for inhibiting the learning control when the abnormality-detection means detects at least one of the abnormalities in pressure regulation and in operation.

12. An automatic transmission control system equipped with first frictional engagement means which is engaged in a gear shift from specified certain first gear stage to specified another certain second gear stage, second frictional engagement means which is disengaged in the gear shift, a pressure modulating valve for regulating engaging pressure to be supplied to the first frictional engagement means, a signal pressure output valve for providing signal pressure to modify pressure regulation level of the pressure modulating valve, wherein said automatic transmission further comprises:
    a switching valve which puts the engaging pressure regulated by the pressure modulating valve to the first frictional engagement means along with putting the signal pressure to the pressure modulating valve in normal state and in addition puts engaging pressure supplied from another oil pressure source to the first frictional engagement means along with putting the signal pressure to a control valve other than the pressure modulating valve in case of failure and;
    abnormality-detection means for detecting, in case of the gear shift to the second gear stage, both an abnormality in pressure regulation of engaging pressure to be supplied to the first frictional engagement means and an abnormnality in operation due to delivery of the signal pressure to the control valve, and
    engine torque-reduction means for reducing engine torque in case that the abnormality-detection means detects at least one of the abnormalities in pressure regulation and in operation.

13. The automatic transmission control system according to claim 12, wherein the engine torque-reduction means comprises a means for carrying out at least one of operations as retarded angle control of ignition timing and fuel injection reduction.

14. The automatic transmission control system according to claim 12, wherein the signal pressure output valve includes a valve for providing signal pressure corresponding to duty ratio.

15. The automatic transmission control system according to claim 12, further comprising;
    a torque converter located to input end of the automatic transmission and equipped with an input member and an output member, and
    a lockup clutch which selectively connects both the input and output members together,
    wherein the control valve includes a valve for controlling engage/disengage of the lockup clutch based on a signal pressure provided by the pressure modulating valve.

16. The automatic transmission control system according to claim 15, wherein the abnormality-detection means comprises a means for detecting abnormality in pressure regulation of engaging pressure to be supplied to the first frictional engagement means and abnormality in engagement of the lockup clutch.

17. The automatic transmission control system according to claim 12, wherein the abnormality-detection means comprises a means for making a judgment on abnormality by detecting a predetermined certain plural number of repetitions of the abnormality in pressure regulation.

18. The automatic transmission control system according to claim 12, wherein the abnormality-detection means comprises a means for making judgment on abnormality in pressure regulation based on a rise in the input revolution speed transmitted to the automatic transmission.

19. An automatic transmission control system which is equipped with first frictional engagement means which is engaged in a gear shift from specified certain first gear stage to specified another certain second gear stage, second frictional engagement means which is disengaged in the gear shift, a pressure modulating valve for regulating engaging pressure to be supplied to the first frictional engagement means, a signal pressure output valve for providing signal pressure to modify pressure regulation level of the pressure modulating valve, a switching valve which puts the engaging pressure regulated by the pressure modulating valve to the first frictional engagement means along with putting the signal pressure to the pressure modulating valve in a normal state and in addition puts engaging pressure supplied from another oil pressure source to the first frictional engagement means along with putting the signal pressure to a control valve other than the pressure modulating valve in case of failure and performs a learning control for renewing regulation level of the pressure modulating valve based on an actual state of control, characterized by;
    abnormality-detection means for detecting, in case of the gear shift to the second gear stage, both an abnormality in pressure regulation of engaging pressure to be supplied to the first frictional engagement means and an abnormality in operation due to delivery of the signal pressure to the control valve, and
    learning control-inhibition means for inhibiting the learning control in case that the abnormality-detection means detects at least one of the abnormalities in pressure regulation and in operation.

20. The automatic transmission control system according to claim 19, wherein the signal pressure output valve includes a valve for providing signal pressure corresponding to duty ratio.

21. The automatic transmission control system according to claim 19, further comprising; a torque converter, located to input end of the automatic transmission and equipped with an input member and an output member, and a lockup clutch which selectively connects both the input and output members together,
    wherein the control valve includes a valve for controlling engage/disengage of the lockup clutch based on the signal pressure provided by the pressure modulating valve.

22. The automatic transmission control system according to claim 21, wherein the abnormality-detection means comprises a means for detecting an abnormality in pressure regulation of engaging pressure to be supplied to the first frictional engagement means and an abnormality in engagement of the lockup clutch.

23. The automatic transmission control system according to claim 19, wherein the abnormality-detection means comprises a means for making a judgment on abnormality by detecting a predetermined certain plural number of repetitions of the abnormality in pressure regulation.

24. The automatic transmission control system according to claim 19, wherein the abnormality-detection means comprises a means for making judgment on abnormality in pressure regulation based on a rise in the input revolution speed transmitted to the automatic transmission.

* * * * *

UNITED STATES PATENT AND TRADEMARK OFFICE
CERTIFICATE OF CORRECTION

PATENT NO. : 5,921,885

DATED : July 13, 1999

INVENTOR(S): Atsushi TABATA, et al.

It is certified that an error appears in the above-identified patent and that said Letters Patent is hereby corrected as shown below:

On the title page, item [87] the PCT publication date should be:

--PCT Pub. Date: Jan. 3, 1997--

Signed and Sealed this

Thirtieth Day of May, 2000

Attest:

Q. TODD DICKINSON

*Attesting Officer*  *Director of Patents and Trademarks*